(12) United States Patent
Nagamoto et al.

(10) Patent No.: US 7,597,372 B2
(45) Date of Patent: Oct. 6, 2009

(54) UNDERFLOOR STORAGE STRUCTURE FOR VEHICLE

(75) Inventors: Satoru Nagamoto, Utsunomiya (JP); Ryosuke Matsuoka, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 661 days.

(21) Appl. No.: 10/535,932

(22) PCT Filed: Feb. 5, 2004

(86) PCT No.: PCT/JP2004/001221

§ 371 (c)(1),
(2), (4) Date: May 20, 2005

(87) PCT Pub. No.: WO2004/069598

PCT Pub. Date: Aug. 19, 2004

(65) Prior Publication Data

US 2006/0016131 A1    Jan. 26, 2006

(30) Foreign Application Priority Data

Feb. 6, 2003    (JP) .............................. 2003-029454

(51) Int. Cl.
*B60R 7/04* (2006.01)

(52) U.S. Cl. .............. 296/37.14; 296/37.15; 296/37.16; 296/37.1; 296/37.8

(58) Field of Classification Search ............... 296/37.2, 296/37.14, 37.15, 37.16, 37.3, 66, 29, 37.8, 296/195, 191; 52/37.1, 100.9, 37.8; 224/297
See application file for complete search history.

(56) References Cited

U.S. PATENT DOCUMENTS

| | | | |
|---|---|---|---|
| 2,568,628 A | 9/1951 | Herring | |
| 5,195,795 A | 3/1993 | Cannera et al. | |
| 5,562,331 A * | 10/1996 | Spykerman et al. | .... 297/188.16 |
| 5,636,890 A * | 6/1997 | Cooper | ...................... 296/37.1 |
| 5,973,917 A * | 10/1999 | White | ......................... 361/683 |
| 6,030,018 A * | 2/2000 | Clare et al. | ................. 296/37.6 |
| 6,145,907 A * | 11/2000 | Maruyama et al. | ........ 296/37.14 |
| 6,189,749 B1 | 2/2001 | Sato et al. | |
| 6,336,671 B1 | 1/2002 | Leonardi | |
| 6,505,874 B2 * | 1/2003 | Ando et al. | ............... 296/37.16 |

FOREIGN PATENT DOCUMENTS

| | | |
|---|---|---|
| DE | 198 34 134 A1 | 2/2000 |
| DE | 19948647 A1 * | 5/2000 |
| DE | 199 48 647 | 5/2001 |
| EP | 1 084 942 A1 | 3/2001 |
| FR | 2 784 645 | 4/2000 |
| JP | 3011086 | 3/1995 |

(Continued)

*Primary Examiner*—Jeanette Chapman
(74) *Attorney, Agent, or Firm*—Hamre, Schumann, Mueller & Larson, P.C.

(57) ABSTRACT

An underfloor storage structure for a vehicle (1) includes a floor panel (P) having a plane portion and a concave portion (11), a floor lid (28) for selectively closing and opening the concave portion (11), a floor bucket (14) provided in the concave portion (11) in a detachable manner; and a tray (15) disposed in the floor bucket (14), which is rotatable in a plane that is substantially parallel to the plane portion of the floor panel (P).

3 Claims, 24 Drawing Sheets

FOREIGN PATENT DOCUMENTS

| | | | |
|---|---|---|---|
| JP | 07277081 A | * | 10/1995 |
| JP | 10-129353 | | 5/1998 |
| JP | 10-297542 | | 11/1998 |
| JP | 11-105746 | | 4/1999 |
| JP | 11129830 A | * | 5/1999 |
| JP | 11286244 A | * | 10/1999 |
| JP | 11301358 A | * | 11/1999 |
| JP | 2000-142247 | | 5/2000 |
| JP | 2000280828 A | * | 10/2000 |
| JP | 2000344015 A | * | 12/2000 |
| JP | 2007269276 A | * | 10/2007 |
| WO | WO 2004/020248 | | 3/2004 |

* cited by examiner

UNDERFLOOR STORAGE STRUCTURE FOR VEHICLE

FIELD OF THE INVENTION

The present invention relates to an underfloor storage structure for a vehicle, and in particular, the present invention relates to an underfloor storage structure, which allows easy use and in which large items can be accommodated.

DESCRIPTION OF RELATED ART

As disclosed in, for example, Japanese Unexamined Patent Application, First Publication No. Hei 11-105746, an underfloor storage structure is known in which a storage section for a spare tire is formed under a floor panel between front seats and rear seats, and a port of the storage section is opened and closed by a floor lid provided in the floor panel. According to such an underfloor storage structure, because the lid for opening and closing the port of the storage section is disposed between the front seats and the rear seats, an advantage is obtained in that the spare tire can be pulled out from and accommodated into the storage section without tilting the seats, i.e., it is easy to handle the spare tire.

In recent years, vehicles are used for multiple purposes, and it is desired that underfloor storage structures allow easy use in accordance with various users' demands. More specifically, it is desired that underfloor storage structures accommodate not only specific items, such as a spare tire as mentioned above, but also various items. In addition, various manners of storage are desired in order to satisfy various users' demands.

SUMMARY OF THE INVENTION

In view of the above circumstances, an object of the present invention is to provide an underfloor storage structure for a vehicle, which allows ease of use, and in which large items can be accommodated, and in addition, which allows easy cleaning operation.

In order to achieve the above object, the present invention provides an underfloor storage structure for a vehicle, including: a floor panel having a plane portion and a concave portion; a floor lid for selectively closing and opening the concave portion; a floor bucket provided in the concave portion in a detachable manner; and a tray disposed in the floor bucket, which is made rotatable in a plane that is substantially parallel to the plane portion of the floor panel.

According to the underfloor storage structure constructed as described above, small items can be stored in the tray housed in the floor bucket disposed in the concave portion in the floor panel, and, when the floor bucket is removed from the concave portion in the floor panel, the concave portion can be used as a large storage space which can accommodate a large item. In addition, the concave portion can be cleaned without having the floor bucket therein.

In the underfloor storage structure described above, two pairs of engagement portions may be provided on the floor bucket and the concave portion, one of which acts to position the floor bucket with respect to the concave portion, the other of which acts to fix the floor bucket in the concave portion. The two pairs of engagement portions may be aligned in a longitudinal direction of the vehicle.

According to the underfloor storage structure constructed as described above, the floor bucket can be inserted through a relatively narrow aperture, the floor bucket can be positioned with respect to the concave portion using one of the two pairs of engagement portions, and the floor bucket can be fixed in the concave portion using the other of the two pairs of engagement portions; therefore, the floor bucket can be easily attached in the concave portion.

In the underfloor storage structure described above, the concave portion may be formed so as to accommodate, without having the floor bucket therein, an item which is larger than the floor bucket.

According to the underfloor storage structure constructed as described above, an item which is larger than the floor bucket can be accommodated in the concave portion. When the underfloor storage structure is applied to, for example, a vehicle in which changing of seat arrangement is allowed depending on the number of occupants, the concave portion can be used as a storage space for accommodating a seat which has been detached in a seat arrangement.

The underfloor storage structure may further include partitions which are made attachable to an inside of the tray so as to form separate storage sections, and are made detachable therefrom.

According to the underfloor storage structure constructed as described above, the size and the numbers of storage sections formed in the tray can be preferably changed in accordance with the size and variations of items to be accommodated in the storage sections.

DESCRIPTION OF THE PREFERRED EMBODIMENTS

An embodiment of the present invention will be explained below with reference to the appended drawings.

Figure 1:
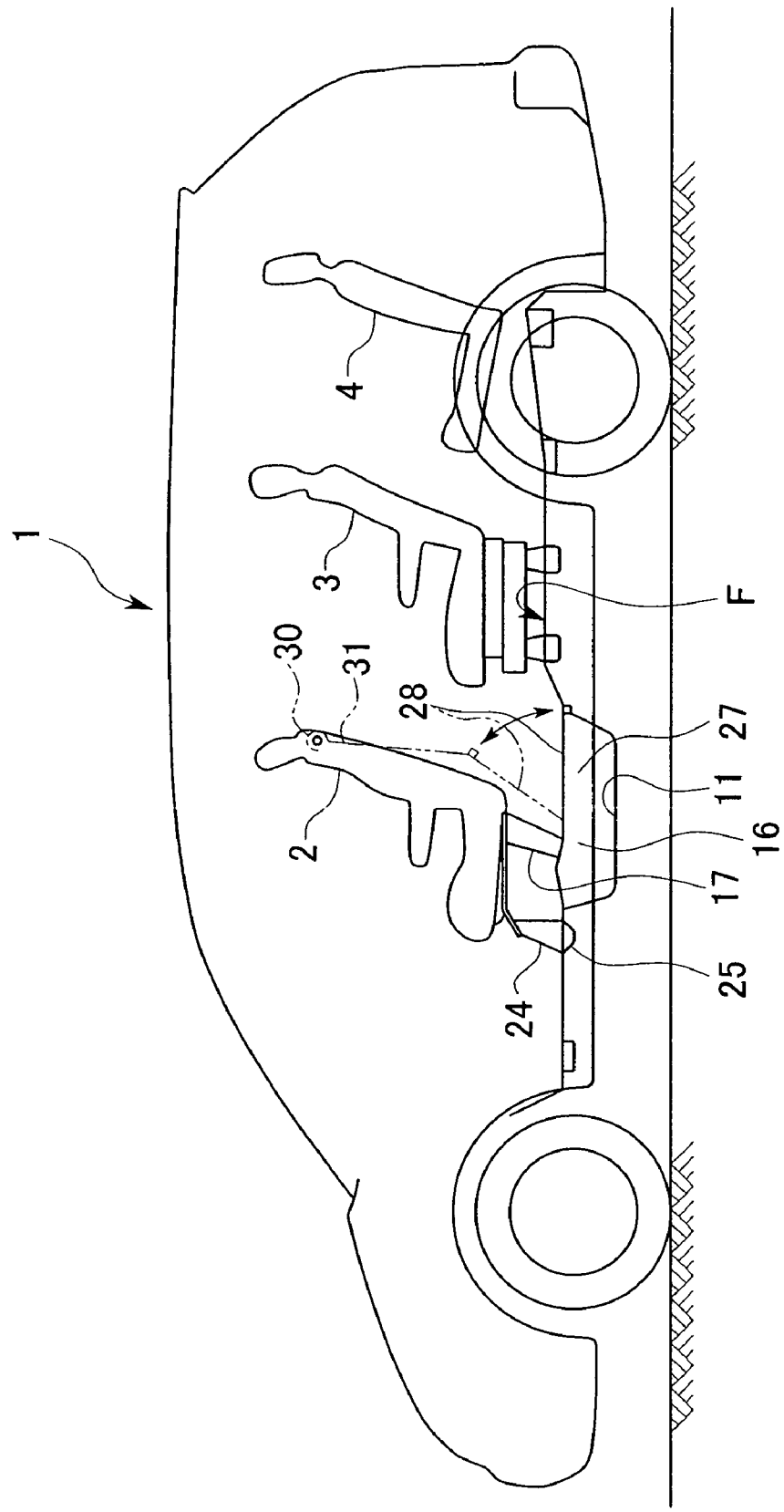
FIG. 1 is a perspective side view showing a vehicle of an embodiment of the present invention.

FIG. 1 shows a two-box style vehicle 1 to which an underfloor storage structure for a vehicle in an embodiment of the present invention is applied, and which includes three rows of seats disposed one behind another.

In the vehicle 1, first row seats 2, which are separated from each other, and second row seats 3, which are also separated from each other, are arranged on a floor F, and a third row seat 4, which is arranged behind the second row seats 3, is formed as a so-called bench seat. Alternatively, the third row seat 4 may be formed like the second row seats 3. The underfloor storage structure according to the present invention is also applicable to a vehicle which includes two rows of seats, i.e., which does not include a third row seat.

Figure 2:
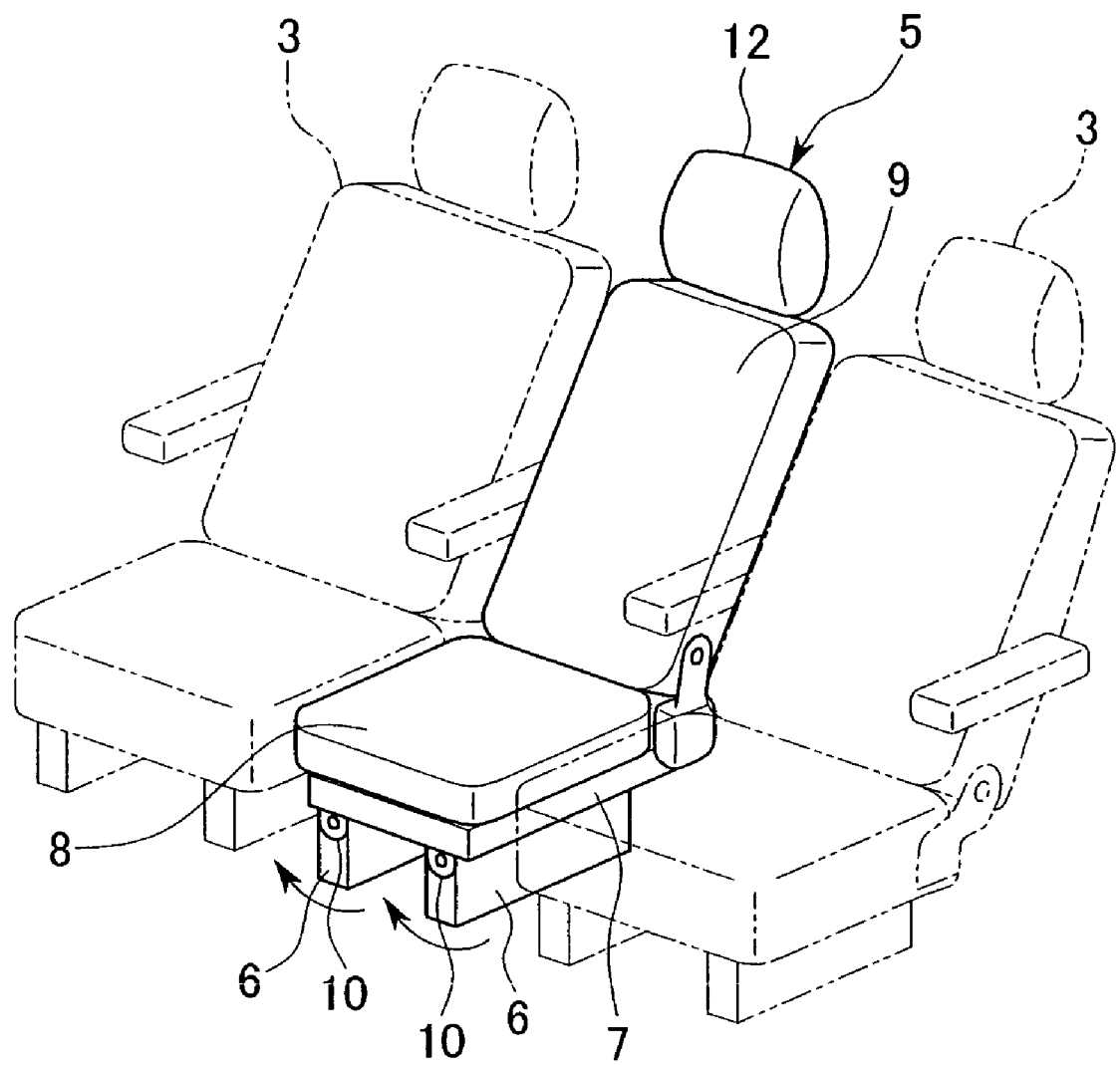
FIG. 2 is a perspective view showing second row seats in the embodiment of the present invention.

As shown in FIG. 2, a center seat 5, which is made narrower than each of the second row seats 3, is disposed between the second row seats 3 and is fixed to the floor F. The center seat 5 includes a seat cushion 7 which is arranged, in a detachable manner, on a seat frame 7 having a pair of legs 6, and a seatback 9 which is attached to a rear end of the seat cushion 7 in a foldable manner with respect to the seat cushion 7. The legs 6 are arranged on the underside and at the side ends of the seat frame 7 along the longitudinal direction of the vehicle 1, and are connected to the seat frame 7 via respective hinge portions 10 so as to be foldable in the lateral direction of the vehicle 1. The underside of each of the legs 6 is attached to the floor F in a detachable manner using a bracket (not shown).

Figure 3A:
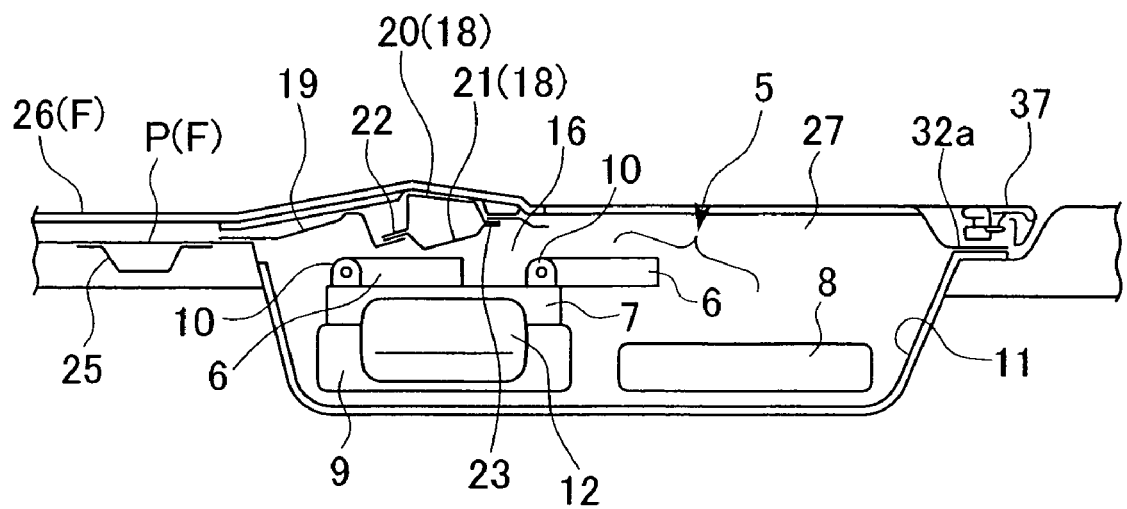
FIG. 3A is a cross-sectional view showing, by an enlarged view of a major portion in FIG. 1, a state in which a center seat in the second row seats is accommodated in a concave portion.
Figure 3B:
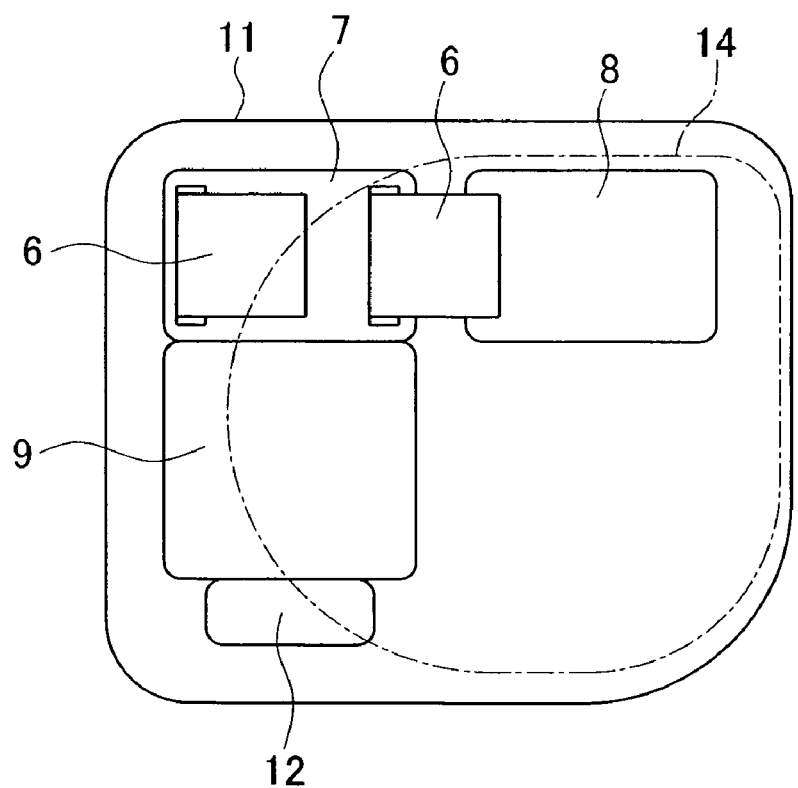
FIG. 3B is a plan view showing the same state.

When the center seat 5 is detached from the floor F, the center seat 5 can be accommodated in a concave portion (or concavity) 11, which will be further explained below, in such a manner that two legs 6 are disposed on top and are folded in one direction, the seat cushion 8 is detached from the seat frame 7, the seatback 9 is folded so as to contact the seat frame 7, and the seat frame 7 and the seat cushion 8 detached from the seat frame 7 are arranged in the longitudinal direction of the vehicle 1, as shown in FIGS. 3A and 3B. FIG. 3B is a plan view showing a state in which the center seat 5 is accommodated in the concave portion 11. Reference numeral 12 indicates a headrest.

Figure 4:
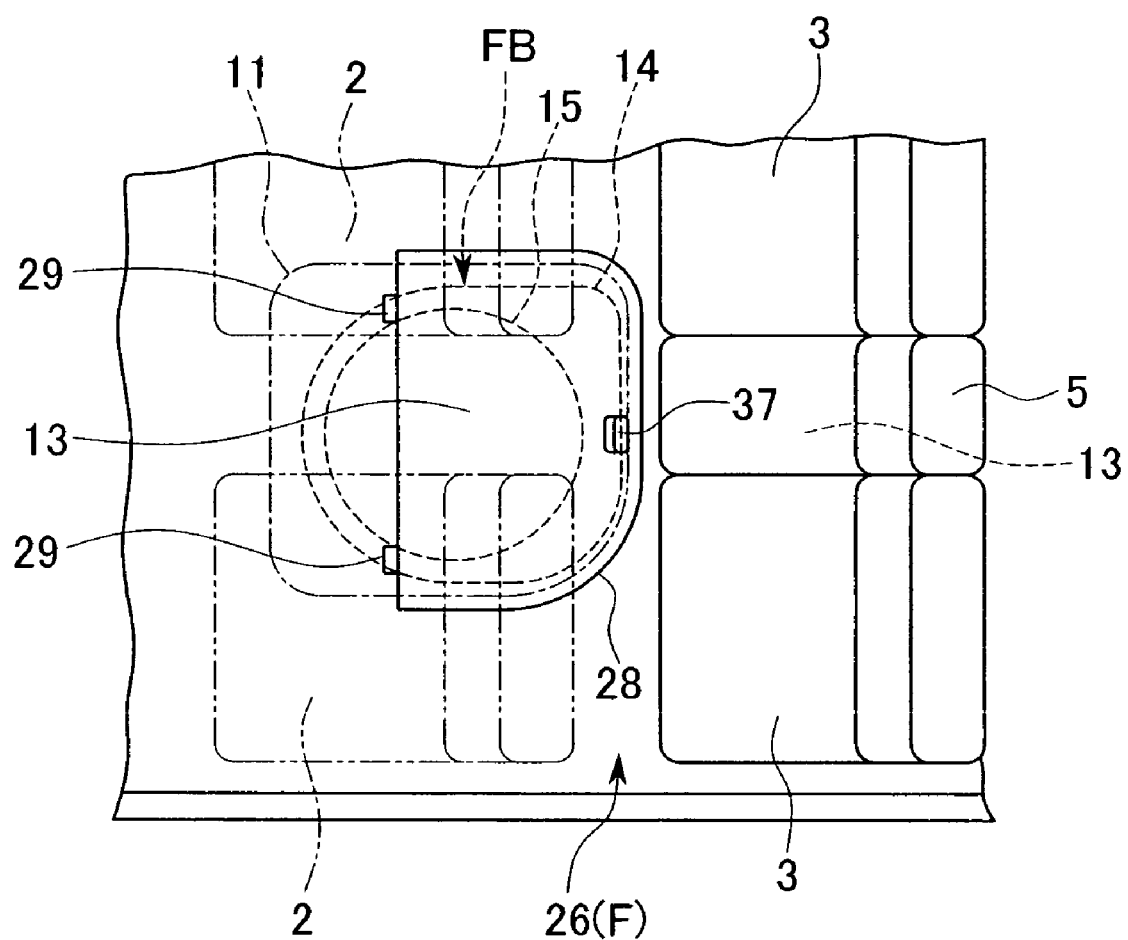
FIG. 4 is a plan view showing a floor in the embodiment of the present invention.
Figure 5:
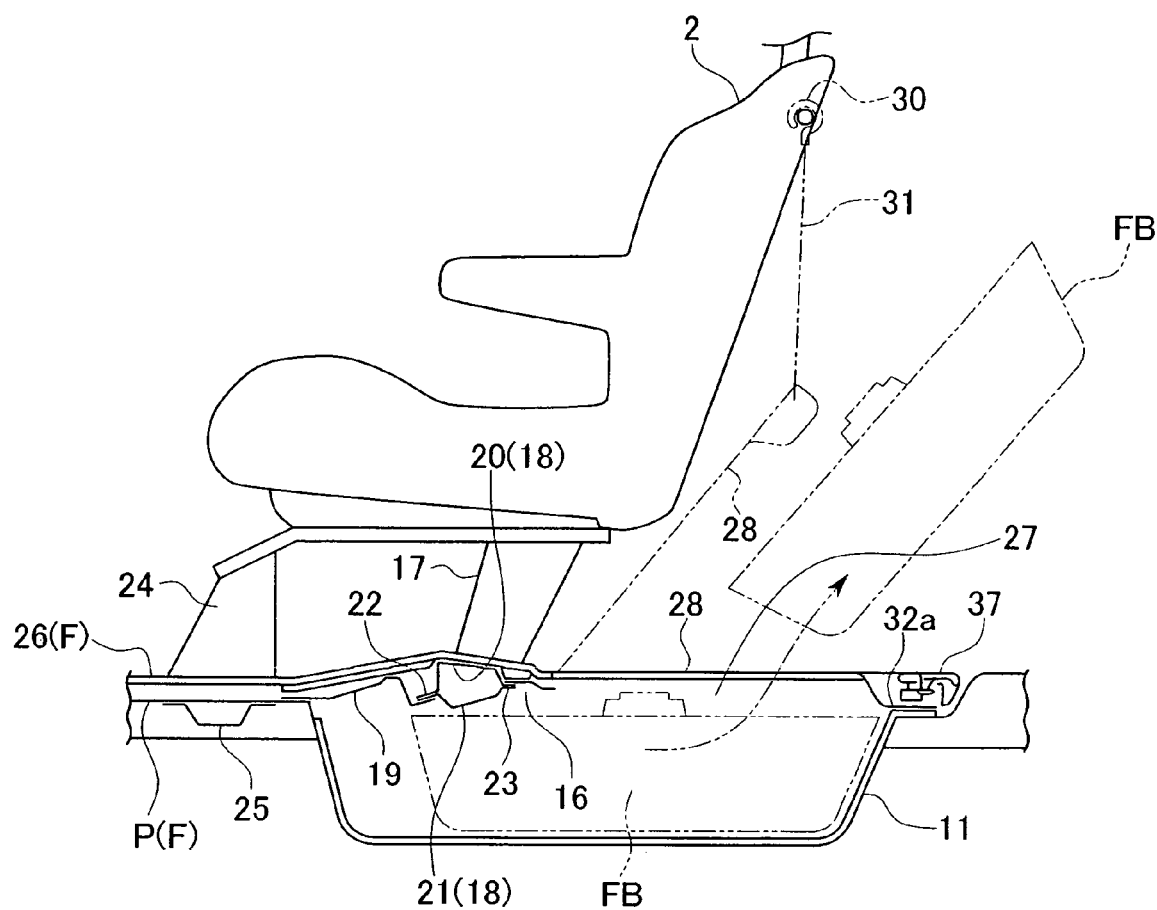
FIG. 5 is a cross-sectional view showing a process by which a floor bucket assembly is removed from the concave portion.
Figure 6:
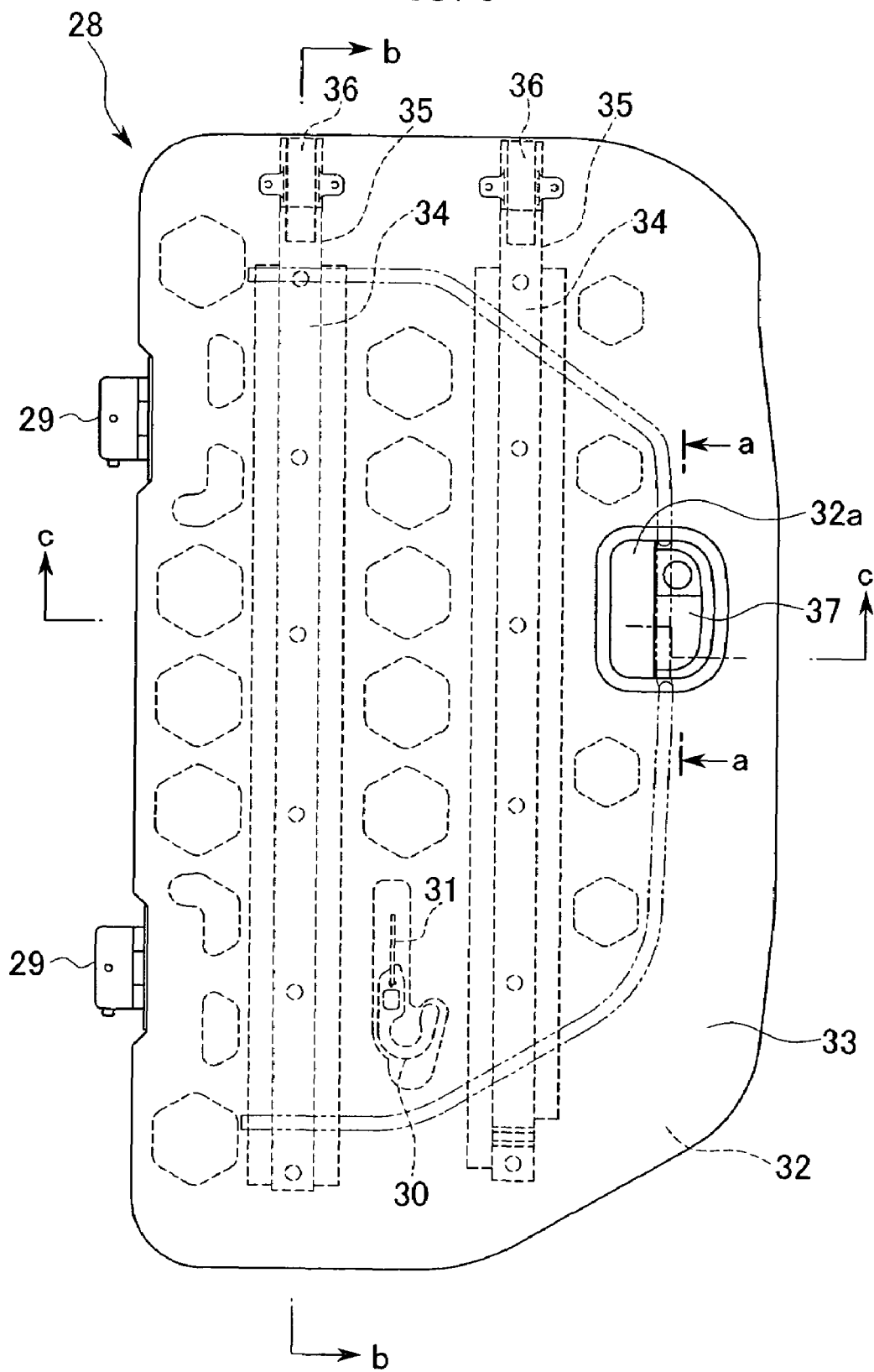
FIG. 6 is a plan view showing a floor lid in the embodiment of the present invention.
Figure 7:
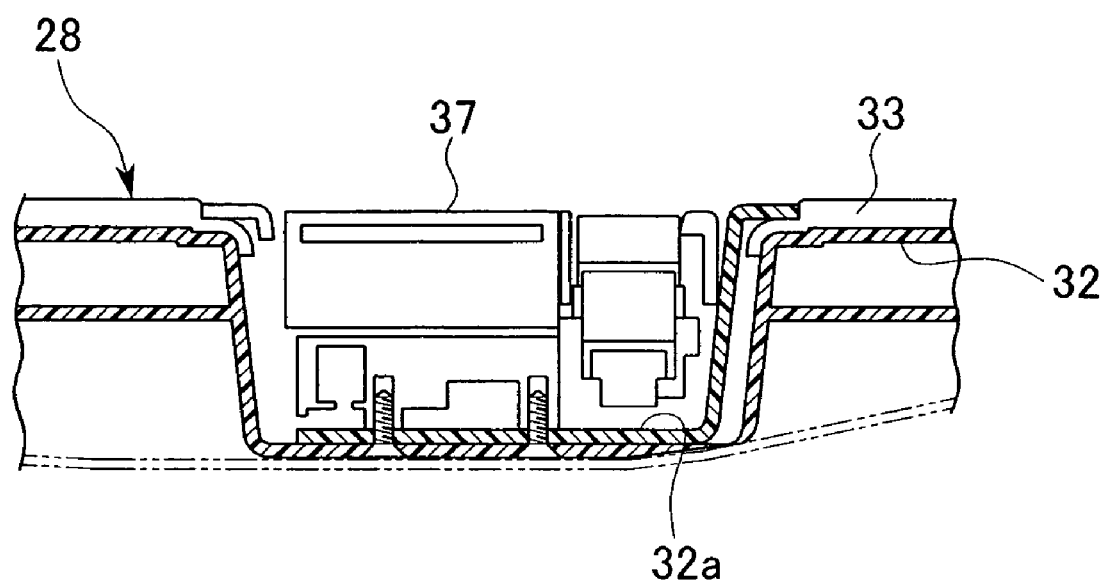
FIG. 7 is a cross-sectional view taken along the line a-a in FIG. 6.
Figure 8:
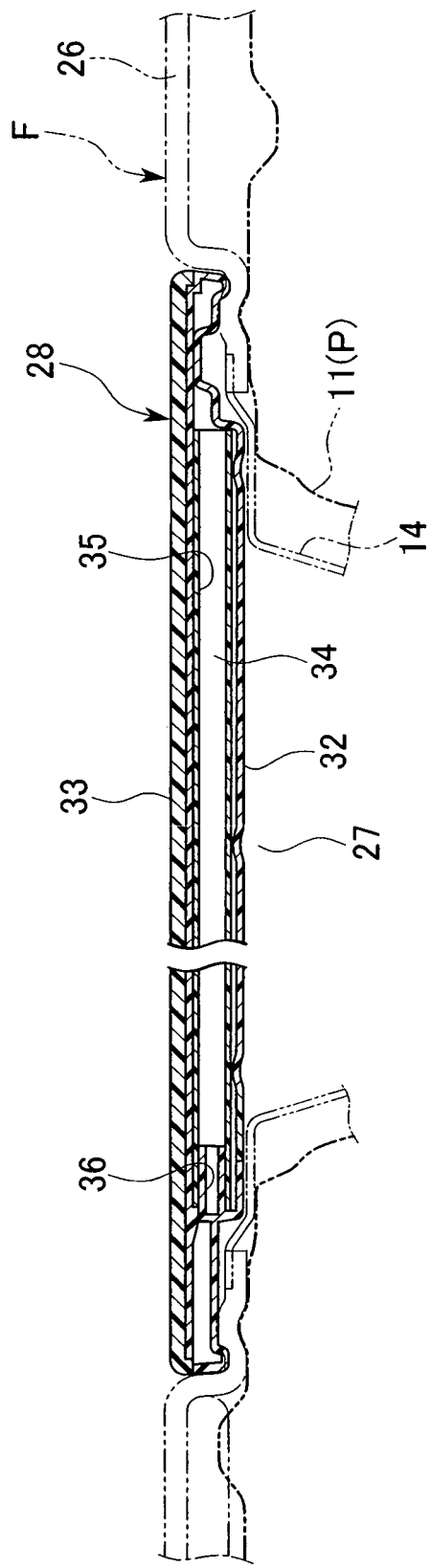
FIG. 8 is a cross-sectional view taken along the line b-b in FIG. 6.
Figure 9:
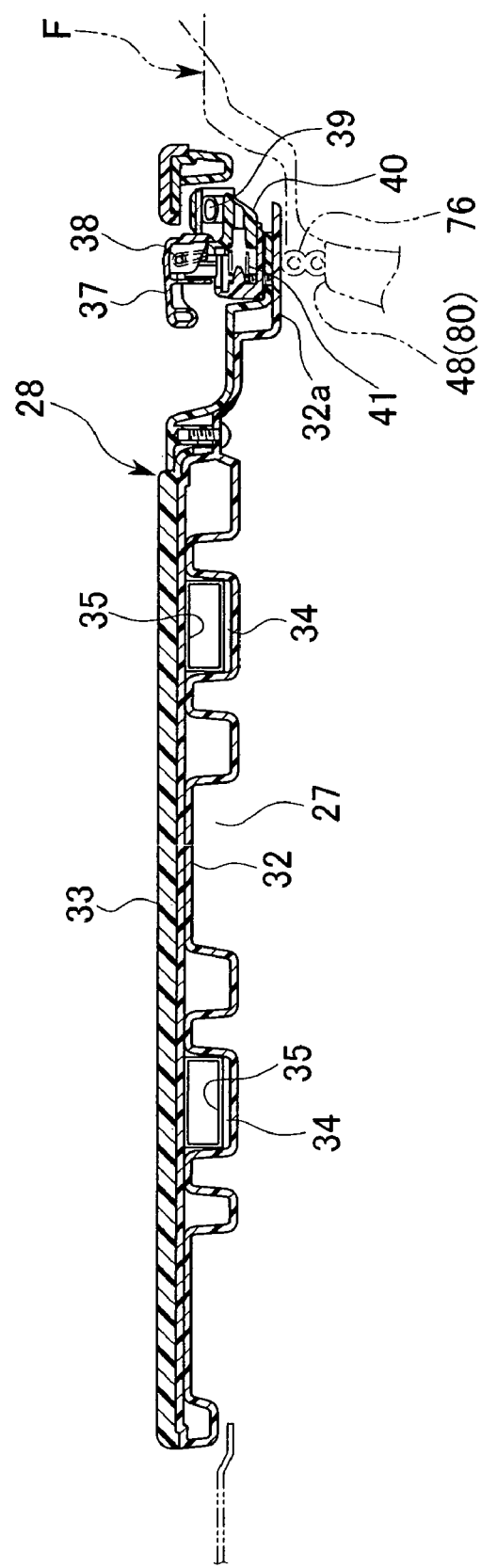
FIG. 9 is a cross-sectional view taken along the line c-c in FIG. 6.

As shown in FIGS. 4 and 5, the space between the first row seats 2 which are separated from each other, and the space between the second row seats 3 from which the center seat 5 is removed are used as an aisle 13 through which the occupants in the vehicle 1 can walk in the longitudinal direction.

In a portion of the floor F that is positioned between the laterally arranged first row seats 2, the quadrangular concave portion 11 is formed so that the folded center seat 5 from which the seat cushion 8 is removed, as explained above, can be accommodated therein. The concave portion 11 is formed so as to have a sufficient size to accommodate the center seat 5, and so as to be larger than a floor bucket 14, which will be further explained below. A relatively large item to be accommodated in the concave portion 11 is not limited to the center seat 5, and other items may be accommodated therein. In the concave portion 11, a floor bucket assembly FB, which will be further explained below, is housed in a detachable manner. The floor bucket assembly FB includes the floor bucket 14, which is attached in the concave portion 111 in a detachable manner, and a tray 15.

Across an upper port 16 of the concave portion 11 and at substantially middle area thereof in terms of the longitudinal direction, there is arranged a cross member 18 having a closed cross-section for supporting rear legs 17 of the first row seats 2. As shown in FIG. 3A, a rear end of a closing plate 19, which is joined to a floor panel P forming a front edge of the concave portion 11 and extends backward from the front edge, is joined to the cross member 18 so that the stiffness of the portion of the floor F is ensured. The closing plate 19 constitutes a portion of the floor F.

More specifically, the cross member 18 includes an upper cross member 20 and a lower cross member 21 which is joined to the upper cross member 20 at a front flange 22 and a rear flange 23. The closing plate 19 is joined to a lower surface of the front flange 22 and to an upper surface of the rear flange 23 (see FIG. 10). Accordingly, the upper port 16 is closed at a front half thereof and is open at a rear half thereof. Front legs 24 of the first row seats 2 are attached to the floor panel P at a portion thereof where a cross member 25, which forms a closed cross-section with the floor panel P, is disposed.

An aperture 27 is formed by a rear edge of the closing plate 19 and a rear edge of the concave portion 11, and a floor carpet 27 is laid on the floor panel P except for the aperture 27. The floor F is constructed by the floor panel P and the floor carpet 27.

A floor lid 28, which is to be opened and closed, is attached to the closing plate 19 so as to cover the rear half of the upper port 16, i.e., to cover the aperture 27 of the concave portion 11.

The floor lid 28 is disposed between the first row seats 2, and is supported by the closing plate 19 in a pivotable manner using a pair of hinge brackets 29 which are provided on a front edge of the floor lid 28.

A strap 31 is connected to the underside of the floor lid 28, and a hook 30, which is connected to an end of the strap 31, is attached to the underside of the floor lid 28 in a detachable manner. The strap 31 and the hook 30 are provided for maintaining the floor lid 28 in an opened state by engaging the hook 30 with a seatback of the first row seat 2 (see FIGS. 1 and 5).

As shown in FIGS. 6 to 9, the floor lid 28 includes an element having, at a front end thereof, a straight edge extending in the lateral direction of the vehicle 1. The hinge brackets 29 are attached to the straight edge. A rear edge of the element is disposed slightly forward with respect to front ends of the seat cushions of the second row seats 3, and is formed in a curved shape so as to prevent interference with the legs of the occupants seated in the second row seats 3 when the floor lid 28 is opened and closed.

The floor lid 28, which has a multi-resin-plate structure, includes a resin base element 32, a resin mat 33 provided on the resin base element 32, and two metal frames 35 arranged one behind the other. The metal frames 35 having a hollow rectangular cross-section are respectively disposed in closed cross-section portions 34 (see FIGS. 6, 8, and 9) of the resin base element 32, each of which extends in the lateral direction of the vehicle 1. Each of the metal frames 35, which has a length greater than the width of the concave portion 11, is attached to the resin base element 32 such that an end thereof is engaged with a boss 36, and the other end thereof is supported by the resin base element 32.

As explained above, because the aperture 27 is covered by the floor lid 28 which is reinforced by the closed cross-section portions 34 of the resin base element 32 and two metal frames 35, sufficient rigidity and strength are ensured for supporting the weight of an occupant walking through the aisle 13.

As shown in FIGS. 5, 6, 7, and 9, the floor lid 28 includes a concave-shaped portion 32a at a rear portion thereof and at a middle position in terms of the lateral direction of the vehicle 1. In a space defined by the concave-shaped portion 32a, a handle 37 is provided in a pivotable manner. The handle 37 is disposed in the space defined by the concave-shaped portion 32a so that the level of the handle 37 is set to be lower than the surface of the floor F so as not to interfere with the flatness of the floor F. The handle 37 is made liftable, and then returnable to a level state by a spring 38 (see FIG. 9). The handle 37 is associated with a locking element 40 which is engageable with a striker 39 provided at the floor F, and which is biased in a locking direction by a spring 41. Accordingly, when the handle 37 is pivoted while overcoming the restoring force of the spring 38, the locking element 40 moves while overcoming the restoring force of the spring 41 and compressing the spring 41 so as to disengage from the striker 39, and as a result, the floor lid 28 can be opened by lifting up the handle 37.

Figure 10:
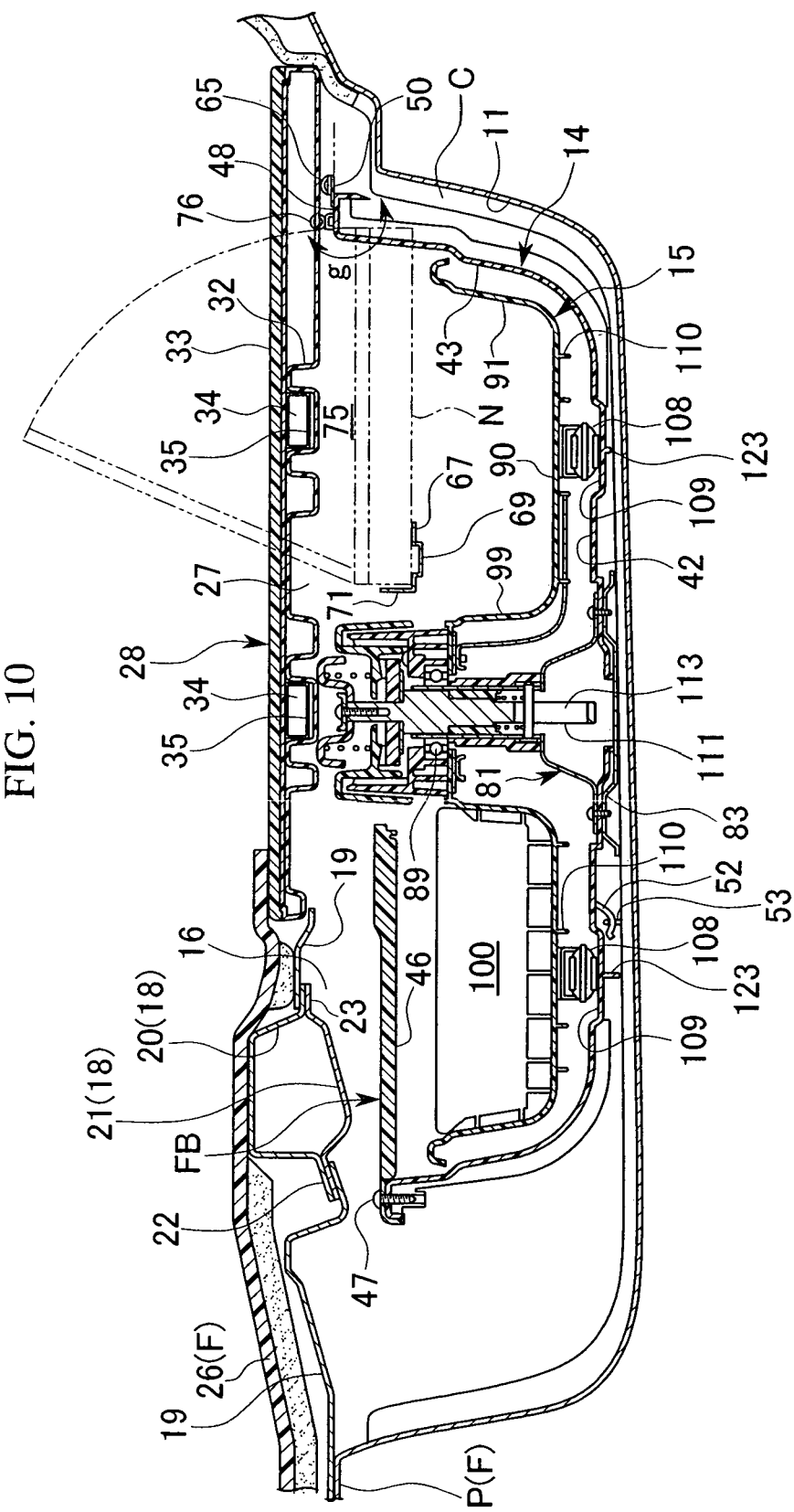
FIG. 10 is an enlarged cross-sectional view showing a major portion in FIG. 5.
Figure 11:
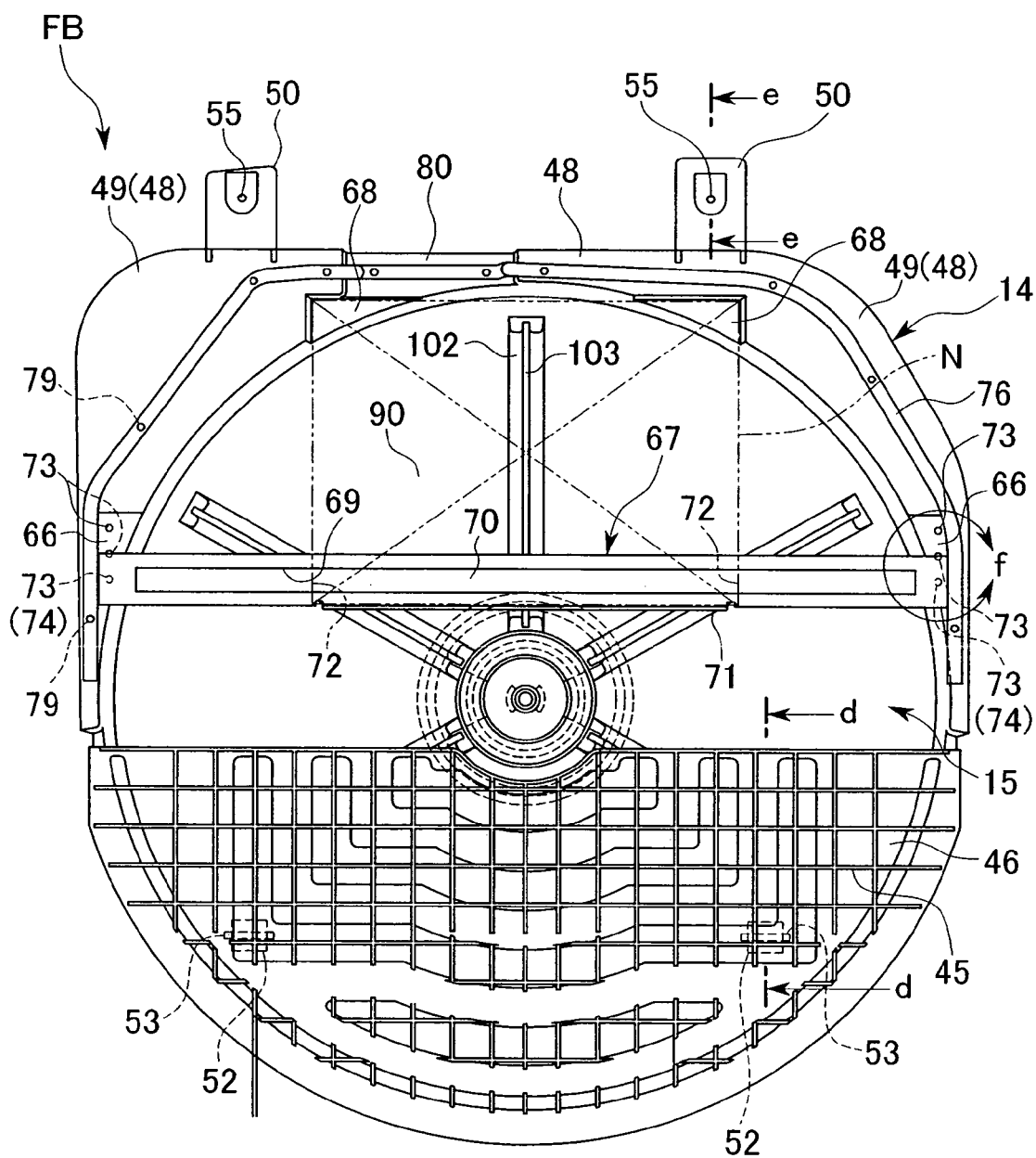
FIG. 11 is a plan view showing the floor bucket assembly in the embodiment of the present invention.

A floor bucket assembly FB shown in FIGS. 10 and 11 is attached in the concave portion 11 and under the above-explained floor lid 28 in a detachable manner.

The floor bucket assembly FB includes the floor bucket 14 having a shape corresponding to the concave portion 11 of the floor panel P, which is mainly made of resin and is attached in the concave portion 11 in a detachable manner, and a tray 15 of resin which is housed in the floor bucket 14, and which is made rotatable in a plane that is substantially parallel to a plane portion of the floor F, i.e., in a substantially horizontal plane.

The floor bucket 14 includes a bottom wall 42 which is made in a substantially flat and circular shape, and a circumferential wall 43 which extends diagonally and upwardly from the circumference of the bottom wall 42. A bucket lid 46 having a substantially half circle shape is attached to a front half upper edge of the circumferential wall 43 of the floor bucket 14 using screws 47 shown in FIG. 10. The bucket lid 46 includes reinforcing ribs 45 on an upper surface thereof, and the underside of the bucket lid 46 is made flat so that accommodated items will not be caught by the bucket lid 46. The bucket lid 46 acts as a partition between the floor panel P under the first row seats 2 and the tray 15 so that problems in which accommodated items are caught by the floor panel P and the rotation of the tray 15 is blocked are avoided, and so that the items can be smoothly put into and taken out of the tray 15.

A flange portion 48, which extends to a rear edge of the concave portion 11 so as to partially cover the concave portion 11, is formed on a rear half upper edge of the circumferential wall 43 of the floor bucket 14. Because the bottom wall 42 of the floor bucket 14 is formed in a circular shape, the flange portion 48 includes, as viewed in a plan view, two wide sections 49 which cover the concave portion 11 at right rear and left rear portions thereof. On the rear edges of the wide sections 49, there are formed attachment pieces 50, respectively, for allowing the flange 48 to be attached to the floor panel P in a detachable manner. The flange 48 further includes, at a position between two wide sections 49, a concave-shaped portion 80 which corresponds to the concave-shaped portion 32a surrounding the handle 37 of the floor lid 28. The level of the flange 48 is set to be higher than that of the bucket lid 46 so that a space 75 for accommodating a notebook-size personal computer N is ensured above the tray 15 in a state in which the floor lid 28 is closed.

Figure 12:
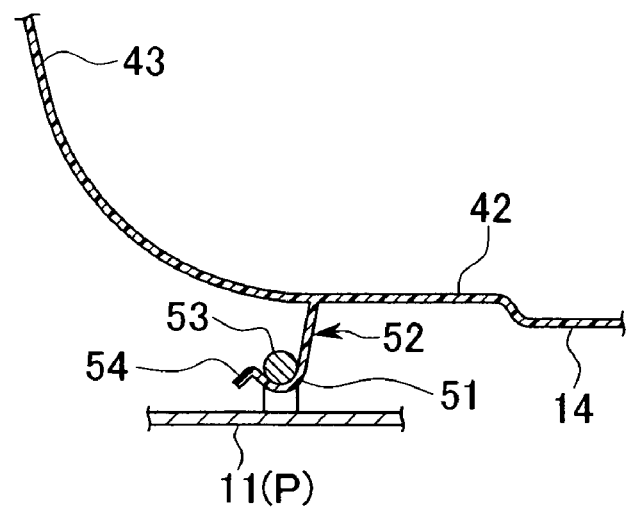
FIG. 12 is a cross-sectional view, taken along the line d-d in FIG. 1, showing a state in which the floor bucket assembly is mounted in position.

On the underside of the bottom wall 42 of the floor bucket 14, there are formed two hooks 52 at the right and left positions, respectively, each of which includes an engagement portion 51 that extends forward, diagonally, and downwardly, and then extends upwardly so as to have a curved shape, as shown in FIG. 12. From an end of the hook 52, a guiding portion 54 extends forward, diagonally, and downwardly, for allowing a striker 53, which is formed on the bottom wall of the concave portion 11 formed in the floor panel P, to be smoothly engaged therewith. Accordingly, when the floor lid 28 is opened, and the floor bucket 14 is inserted into the concave portion 11, the hooks 52 engage the strikers 53 so as to block forward movement of the floor bucket 14.

Figure 13:
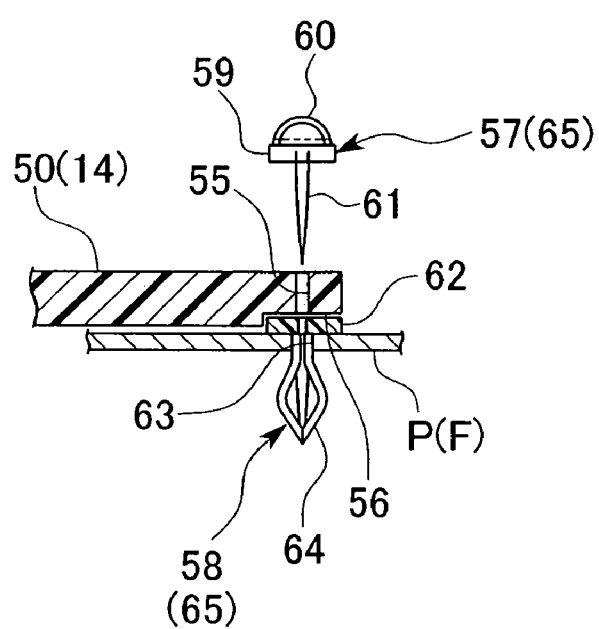
FIG. 13 is a cross-sectional view, taken along the line e-e in FIG. 11, showing a state in which the floor bucket assembly is mounted in position.

As shown in FIG. 13, the attachment piece 50 includes a lock pin hole 55 for holding a lock pin 57 being inserted and a stepped portion 56 formed on the underside of the attachment piece 50. The floor bucket 14, i.e., the floor bucket assembly FB, is attached to the floor panel P in a detachable manner using the attachment pieces 50 and clips 65, each of the clips 65 including the lock pin 57 and a clip body 58. Because the floor bucket 14 is engaged, at a front portion thereof, with the floor panel P using the strikers 53 and the hooks 52, and is fixed to the floor panel P using the lock pins 57, the floor bucket 14 can be smoothly attached to and detached from the floor panel P even though the aperture 27 which opens toward the compartment of the vehicle 1 is not wide, and the floor bucket 14 can be reliably fixed to a body of the vehicle 1 even though the concave portion 11 is made larger than the floor bucket 14.

More specifically, the lock pin 57 includes a flat head 59, a pivotable handle 60 which is provided on the flat head 59 for allowing the lock pin 57 to be drawn out, and which is made pivotable to lie flat, and a pin portion 61 extending downwardly from the flat head 59. On the other hand, the clip body 58 is made insertable into a through hole 63 formed in the floor panel P and under a clip head 62. The clip body 58 has an elastic portion 64 which radially expands when the pin portion 61 of the lock pin 57 is inserted thereinto so as to prevent the clip body 58 from coming out the through hole 63 formed in the floor panel P.

Accordingly, when the lock pin 57 is inserted into the lock pin hole 55 formed in the attachment piece 50 in a state in which the elastic portion 64 of the clip body 58 is inserted into the through hole 63 formed in the floor panel P, and the clip head 62 is disposed at the stepped portion 56 of the attachment piece 50 so as to be sandwiched between the attachment piece 50 and the floor panel P, because the elastic portion 64 of the clip body 58 radially expands due to the pin portion 61 of the lock pin 57, the attachment piece 50, i.e., the floor bucket 14, is maintained to be fixed to the floor panel P unless the lock pin 57 is removed. The strength and stiffness of the bottom wall 42 of the floor bucket 14 are ensured by forming reinforcing ribs 123 (see FIGS. 10 and 16).

Figure 14:
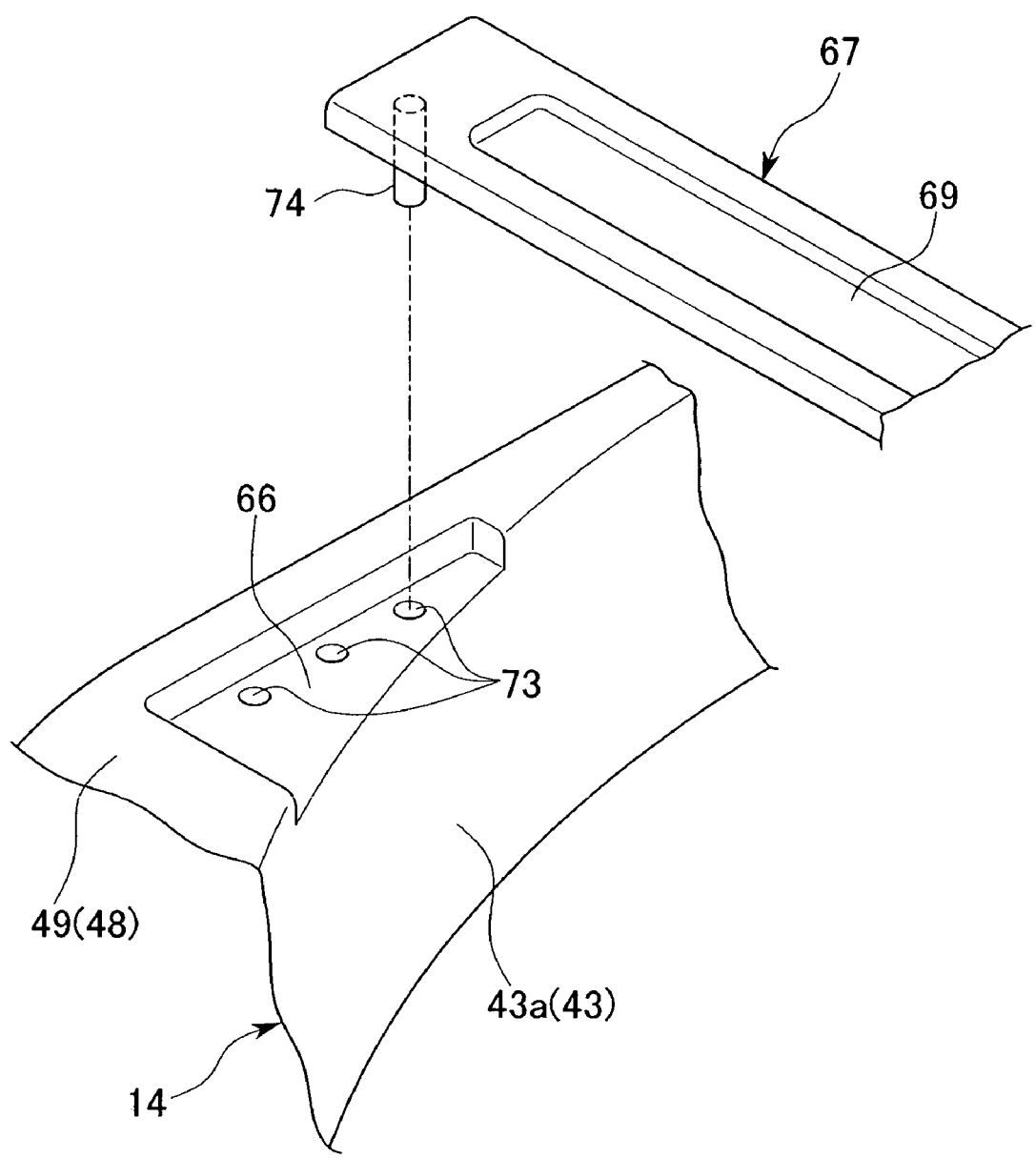
FIG. 14 is a perspective view showing the "f" portion in FIG. 11 in a state in which a PC (personal computer) bracket has not been mounted.
Figure 15:
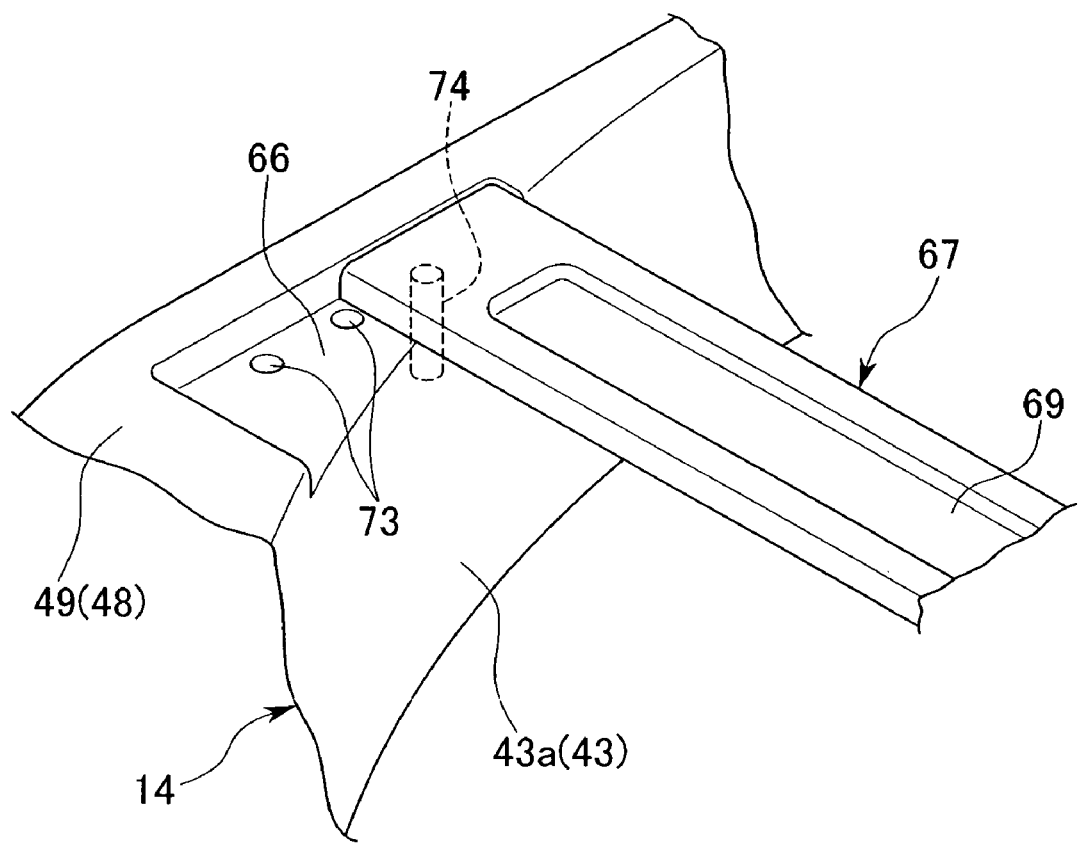
FIG. 15 is a perspective view showing the "f" portion in FIG. 11 in a state in which the PC bracket is mounted.
Figure 16:
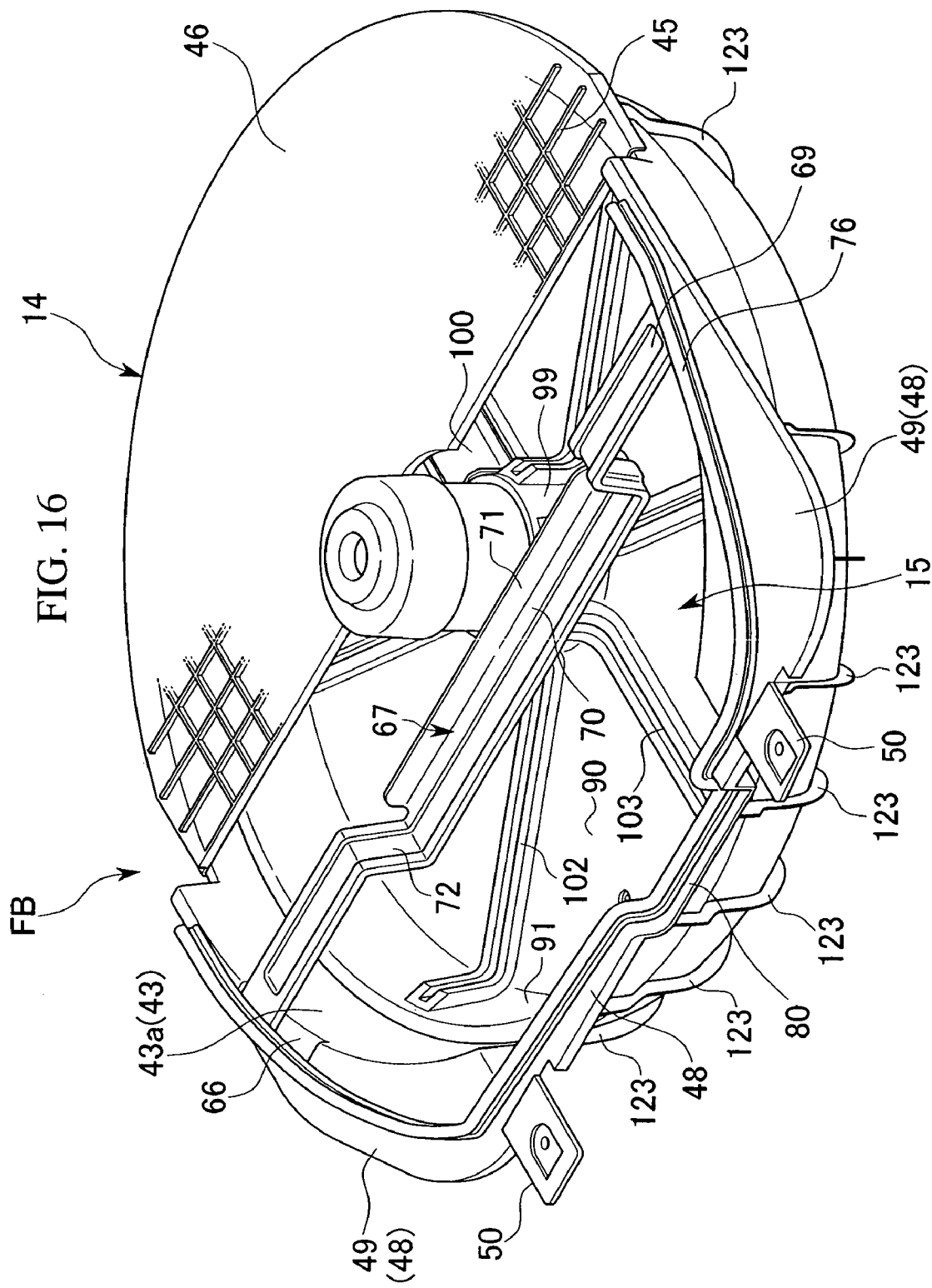
FIG. 16 is a perspective view showing the floor bucket assembly in the embodiment of the present invention.

As shown in FIGS. 14 to 16, under the floor lid 28 and above the tray 15, there is disposed a personal computer bracket 67 (hereinafter abbreviated as PC bracket) which extends in the lateral direction of the vehicle 1 while connecting a portion of a side wall 43a of the circumferential wall 43 of the floor bucket 14 to another portion of the side wall 43a. Each end of the PC bracket 67 abuts against a set base 66 which is a concave portion formed in the wide section 49 in the flange portion 48 of the floor bucket 14. The PC bracket 67, which acts as one of engagement portions for the notebook-size personal computer N (shown in FIGS. 10 and 11), is a metal element for supporting front ends of the notebook-size personal computer N.

As shown in FIG. 11, two concave portions 68, which oppose the PC bracket 67, are formed in the rear portion of the flange portion 48 of the floor bucket 14 in order to support rear corners of the notebook-size personal computer N. Each concave portion 68 is formed in a substantially triangular shape, and is positioned near the attachment piece 50. The notebook-size personal computer N can be placed under the floor lid 28 while bridging from the PC bracket 67 to the concave portions 68.

As shown in FIG. 16, the PC bracket 67 is a narrow plate-shaped element, and includes a reinforcing rib 69 extending in a direction of length of the PC bracket 67. The PC bracket 67 includes a bent portion 70 which is formed in a concave shape at the substantially the middle of the length thereof. The length of a bottom of the bent portion 70 is set to be the same as the width of the notebook-size personal computer N so that the front ends of the notebook-size personal computer N are fitted in the bent portion 70. In addition, a vertical wall 71 is formed at the front edge of the bottom of the bent portion 70 so that forward movement of the front ends of the notebook-size personal computer N is prevented by the vertical wall 71.

Accordingly, even when a forward force is applied to the notebook-size personal computer N during such as a braking operation, the notebook-size personal computer N is prevented from coming off the PC bracket 67. The bent portion 70 includes side walls 72 arranged in the lateral direction of the vehicle 1, which prevent lateral movement of the notebook-size personal computer N. Moreover, backward movement of the notebook-size personal computer N during such as a starting operation of the vehicle 1 is also prevented by two concave portions 68 for supporting the rear corners of the notebook-size personal computer N.

As shown in FIGS. 14 and 15, the PC bracket 67 includes pins 74 disposed on the underside of both ends thereof, respectively, which selectively engage locating holes 73 that are formed in each of the set bases 66 of the flange portions 48. In each of the set bases 66, there are formed three locating holes 73 (any other number may be used instead) arranged in the longitudinal direction of the vehicle 1 so that the position of the PC bracket 67, and more specifically, the position of the vertical wall 71, can be adjusted depending on the dimension, in the longitudinal direction, of the notebook-size personal computer N.

The notebook-size personal computer N is set in place through the steps of fitting the rear corners of the notebook-size personal computer N in the concave portions 68, selecting a set of locating holes 73 while moving the PC bracket 67 in the longitudinal direction so that the position of the vertical wall 71 coincides with the front end of the notebook-size personal computer N, and inserting the pins 74 into the selected locating holes 73.

As explained above, the space 75 (shown in FIG. 10) located under the floor lid 28 and above the tray 15 is efficiently used for holding a notebook-size personal computer in a vehicle even though it is, in general, difficult to hold one of notebook-size personal computers, which are widely used, in a vehicle.

Figure 17:
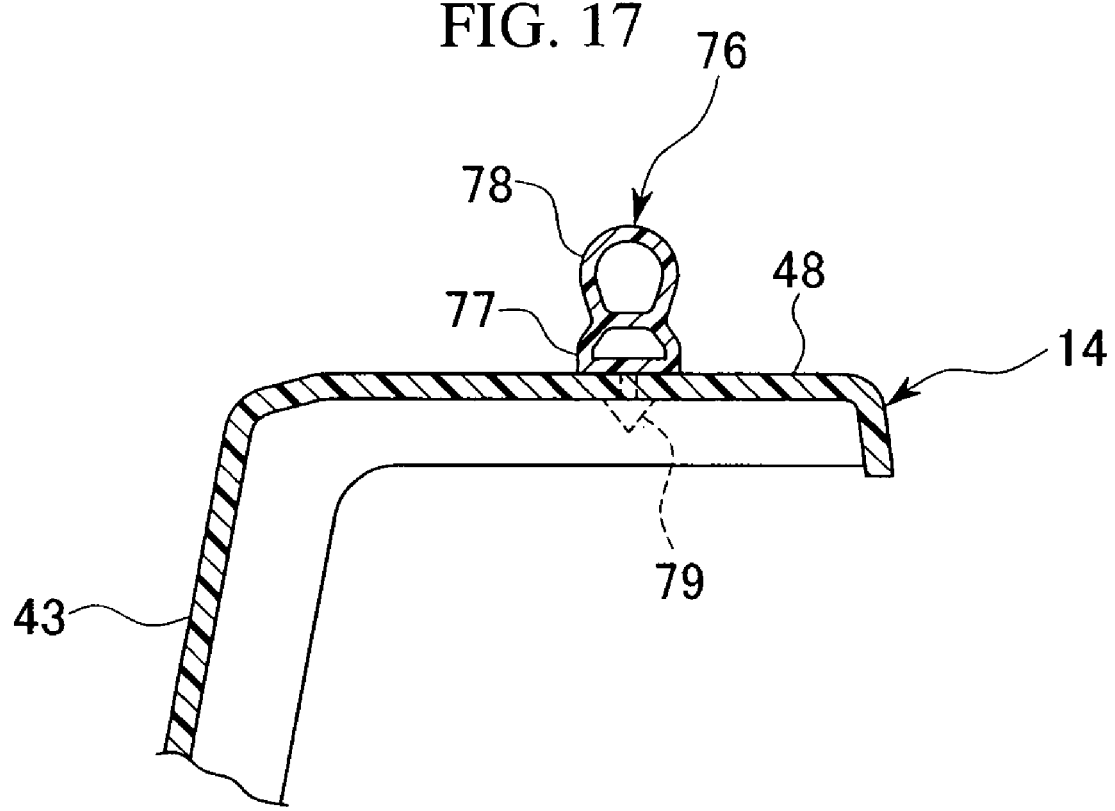
FIG. 17 is an enlarged view showing the "g" portion in FIG. 10.

As shown in FIGS. 11, 16, and 17, a rubber seal 76 is attached to an upper surface of the flange portion 48 so as to surround a rear half of the floor bucket 14.

The rubber seal 76 includes a hollow base 77 forming a lower portion of the rubber seal 76, and a hollow lip 78 forming an upper portion of the rubber seal 76, and is attached to the flange portion 48 via attachment portions 79 that are formed under a bottom wall of the hollow base 77 at predetermined intervals. More specifically, the rubber seal 76 is attached to the flange portion 48 along two wide sections 49 and along the concave-shaped portion 80 which corresponds to the concave-shaped portion 32a surrounding the handle 37 of the floor lid 28. Alternatively, clips may be used instead of the attachment portions 79.

When the floor lid 28 is closed, the hollow lip 78 of the rubber seal 76 contacts the underside of the floor lid 28, including the underside of the concave-shaped portion 32a, in a sealed manner, so that fluid, such as water, is not allowed to flow from the floor carpet 26 of the floor F into the rear half of the floor bucket 14. Accordingly, even when juice, beverages, water dripped from an umbrella, etc., flows forward from the floor carpet 26 located under the second row seats 3, such fluid will not flow into the floor bucket 14.

Figure 21:
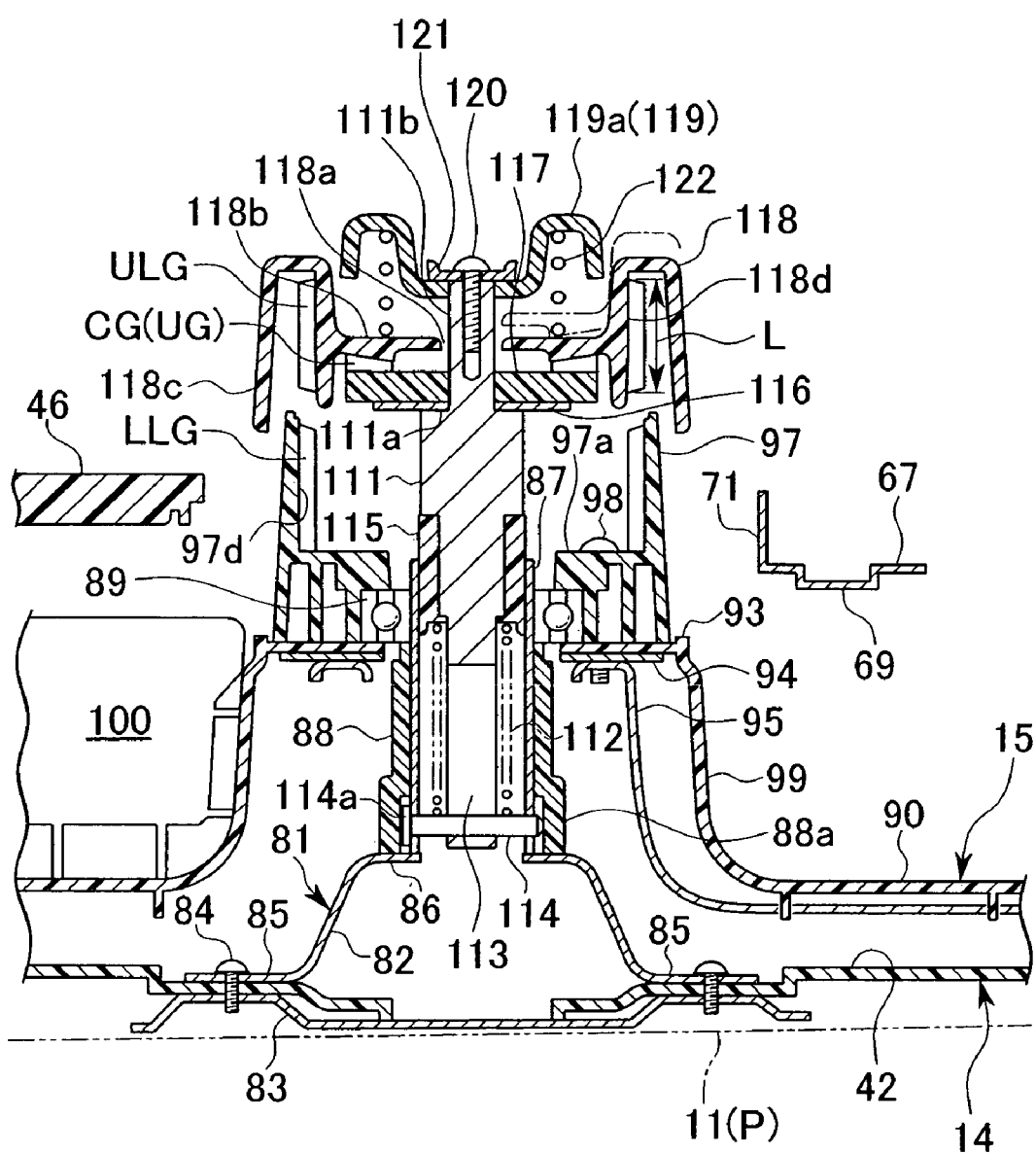
FIG. 21 is an enlarged cross-sectional view showing a mounting portion for the rotatable tray.

As shown in FIG. 21, an axle assembly 81 for rotatably supporting the tray 15 via a bearing is provided at the center of the bottom wall 42 of the floor bucket 14. The axle assembly 81 includes a metal support element 82, a metal back plate 83, and the floor bucket 14 of resin (more specifically, the bottom wall 42 thereof) which is sandwiched between the metal support element 82 and the metal back plate 83, and is fixed thereto using screws 84.

The support element 82 is formed by press-forming a metal plate into a cup shape, and is attached to the bottom wall 42 of the floor bucket 14 while a port of the support element 82 is directed downward. The support element 82 includes a flange portion 85 around the port thereof. The metal back plate 83, which abuts against the underside of the bottom wall 42 of the floor bucket 14, is disposed so as to match the position of the flange portion 85. The support element 82 is reinforced by connecting the metal back plate 83 to the flange portion 85 using the screws 84, i.e., the stiffness of the support element 82 is increased by sandwiching the bottom wall 42 of the floor bucket 14 between the flange portion 85 and the metal back plate 83.

The support element 82 further includes an upper wall 86, and the axle assembly 81 further includes an axle 87 which is made of a metal pipe, and which is welded to the upper wall 86. A collar 88 made of resin is disposed so as to surround the axle 87. The bearing 89 for rotatably supporting the tray 15 is disposed so as to surround the axle 87 and to abut against an upper end of the collar 88.

Figure 18:
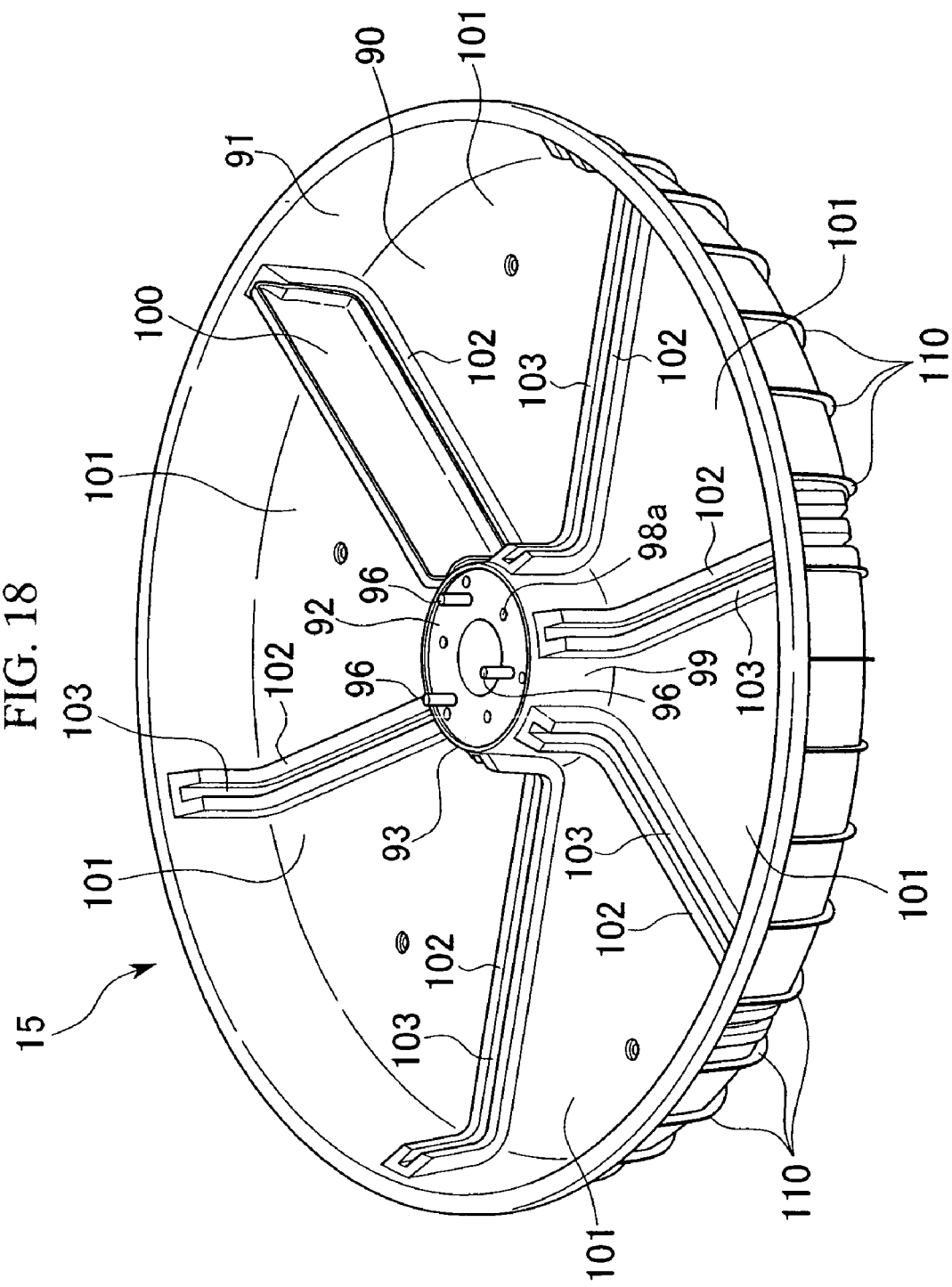
FIG. 18 is a perspective view showing a rotatable tray in the embodiment of the present invention.

As shown in FIG. 18, the tray 15, which is an element of resin, includes a circular bottom wall 90 and a circumferential wall 91, corresponding to the floor bucket 14, and further includes a mounting portion 93 having a shoulder portion 92 that protrudes so as to clear the axle assembly 81. As shown in FIG. 21, a metal reinforcement 95, which is, via a metal plate 94, attached to the underside of the shoulder portion 92 of the mounting portion 93, radially extends under the circular bottom wall 90 of the tray 15.

The mounting portion 93 (i.e., tray 15), the metal plate 94, the metal reinforcement 95, and a lower gear 97, which will be explained below, are connected together while sandwiching the bearing 89 between the mounting portion 93 and the lower gear 97. More specifically, pins 96 protruding, as shown in FIG. 18, from the shoulder portion 92 of the tray 15 are inserted into the lower gear 97 so that the lower gear 97 is positioned, and then the metal plate 94 and the metal reinforcement 95 are connected together, as shown in FIG. 21, using the screws 98 which are inserted downward through a bottom wall 97a of the lower gear 97. The shoulder portion 92 of the tray 15 includes three through holes 98a for the pins 96 and three through holes 98a for the screws 98.

The tray 15 includes six ribs 102, which are disposed radially at every 60 degrees, and each of which protrudes from the bottom wall 90 of the tray 15 while extending from a peripheral wall 99 of the mounting portion 93, along an upper surface of the bottom wall 90 of the tray 15, and to an inner surface of the circumferential wall 91. A groove 103 is formed in and along each of the ribs 102, in which a partition 100 is made attachable in a detachable manner.

By inserting the partitions 100 into the grooves 103, six storage sections 101, at maximum, can be formed in the tray 15. Accordingly, items may be stored in the storage sections 101 in an orderly manner.

Figure 19:
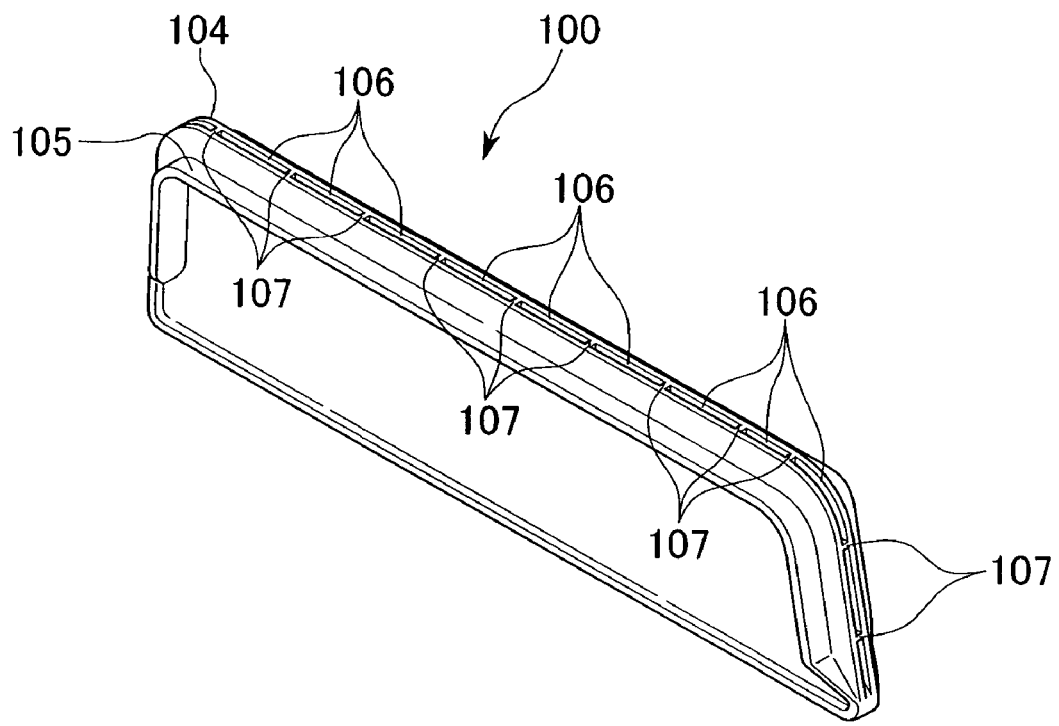
FIG. 19 is an upward perspective view showing a partition in the embodiment of the present invention.

As shown in FIG. 19, the partition 100 includes an insertion portion 104 which is to be inserted into the groove 103, and abutting portions 105 which together sandwich the insertion portion 104, and which are to abut against upper surfaces of the rib 102.

Figure 20:
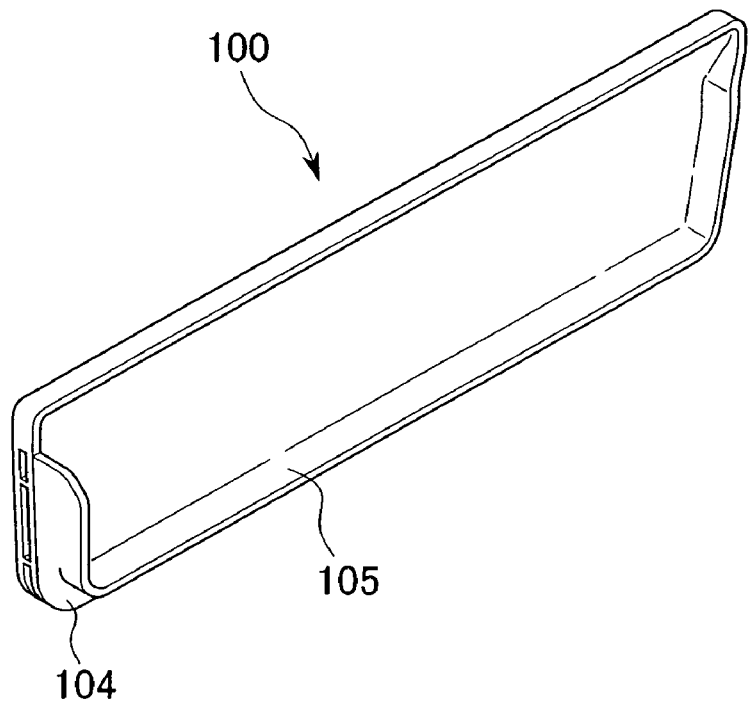
FIG. 20 is a downward perspective view showing the partition in the embodiment of the present invention.

As shown in FIG. 20, because each of the abutting portions 105 is a rib-shaped portion that is formed so as to extend along a bottom side and vertical sides of the partition 100, the abutting portions 105 also act as reinforcements for the partition 100.

The insertion portion 104 of the partition 100 is not formed in a solid structure, but includes a gap 106 extending in the direction of length of the insertion portion 104 of the partition 100. Because some ribs 107 are formed in the gap 106 so as to extend in the direction of thickness of the partition 100 and to connect walls that form the gap 106 to each other at predetermined intervals, the partition 100 can be made light, and the insertion portion 104 can be inserted into the groove 103 in an elastic manner, and thereby easy coming-off of the partition 100 can be prevented.

As shown in FIG. 10, rollers 108 are attached on the underside of the bottom wall 90 of the tray 15 in order to reduce rotational friction of the tray 15 that rotates about the axle assembly 81 while being supported by the bearing 89.

The rollers 108 allows smooth rotation of the tray 15 with respect to the floor bucket 14 while rolling in and along a circular concave portion 109. Reinforcing ribs 110 are formed on the underside of the bottom wall 42 of the tray 15 so that strength and stiffness of the tray 15 are increased. A carpet C is adhered to the surface of the concave portion 11 so that the center seat 5 accommodated therein will not become soiled.

As shown in FIG. 21, in the axle assembly 81, more specifically, in the axle 87, there is provided a metal shaft 111 in such a manner that the metal shaft 111 is made movable vertically while being biased upward by a spring 112. Elongated through holes 113 are formed in the metal shaft 111, and a lock pin 114 is disposed so as to penetrate the elongated through holes 113 so that vertical movement and coming off of the metal shaft 111 that is biased by the spring 112 are not allowed.

A spacer 115, which enables smooth vertical sliding of the shaft 111 with respect to the inner surface of the axle 87, is provided so as to surround a portion of the shaft 111 where relative movement between the shaft 111 and the axle 87 occurs. The spring 112 is disposed between the spacer 115 and the lock pin 114. The collar 88 includes a radially expanded portion 88a at a lower portion thereof. The radially expanded portion 88a covers heads 114a of the lock pin 114 so that the collar 88 acts as an element for preventing coming off of the lock pin 114. Accordingly, another element for preventing the coming off of the lock pin 114, such as an E-ring, is not required, and thereby the number of elements can be reduced.

Figure 22:
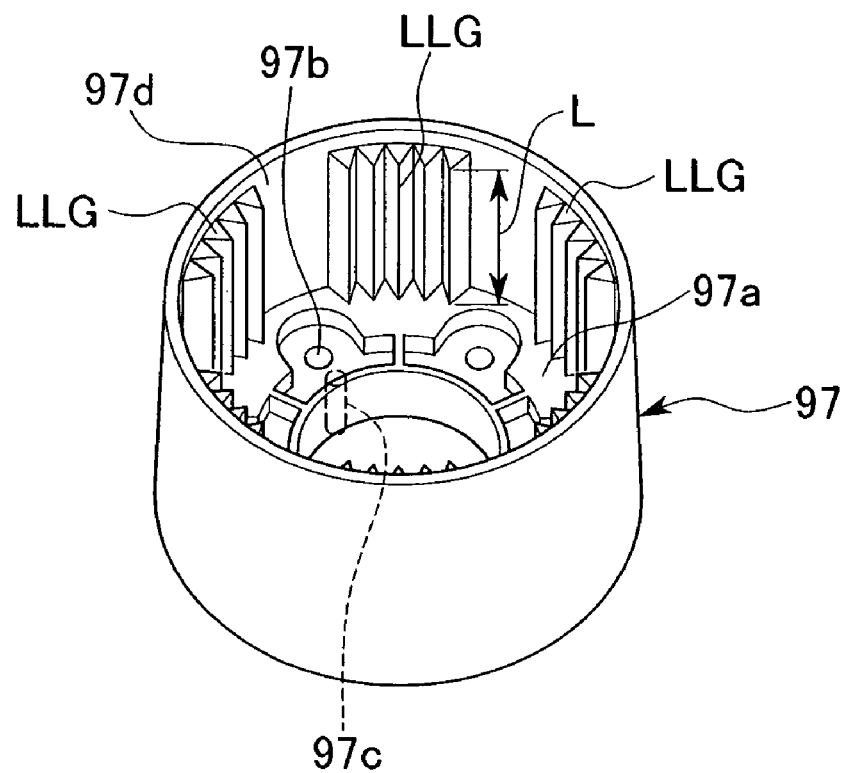
FIG. 22 is a perspective view showing a lower gear of the mounting portion for the rotatable tray.
Figure 25:
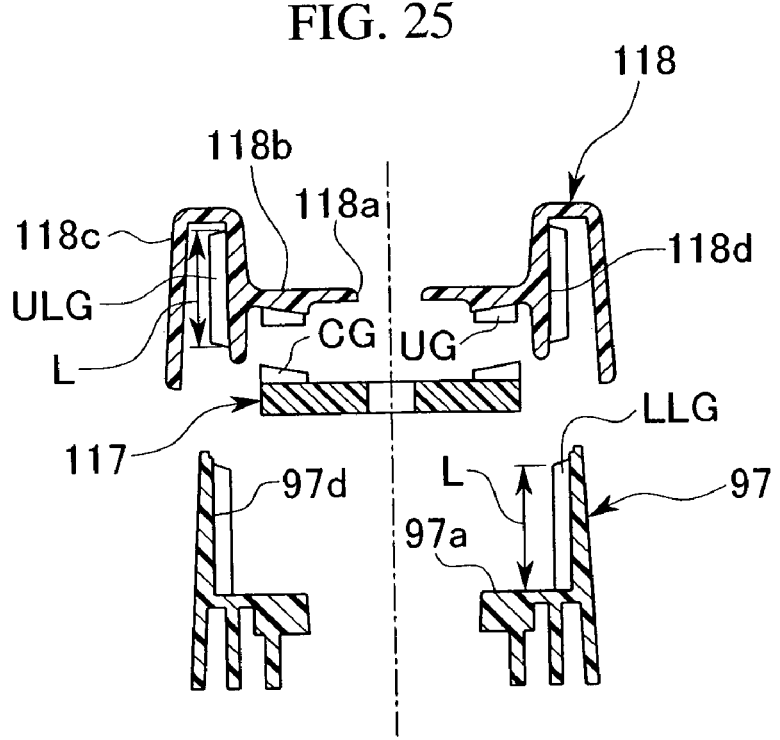
FIG. 25 is a cross-sectional view showing the positional relationship among the gears.

As shown in FIGS. 22 and 25, is a cup-shaped element having a port being open upward, and includes, in the bottom wall 97a thereof, screw holes 97b and pin holes 97c that correspond to the pins 96 provided on the shoulder portion 92 of the tray 15. In circumferentially separated portions of an inner surface of a circumferential wall 97, there are formed lower lock teeth LLG extending in the vertical direction (having a length of L).

As shown in FIG. 21, a stepped portion 111a is formed at an upper portion of the shaft 111. A washer 116 abuts against the stepped portion 111a, and a circular clutch gear 117 is fixed to the shaft 111 in such a manner that the circular clutch gear 117 abuts against the washer 116, and a small diameter portion 111b, which is located at an upper portion of the shaft 111, penetrates through the circular clutch gear 117.

Figure 23:
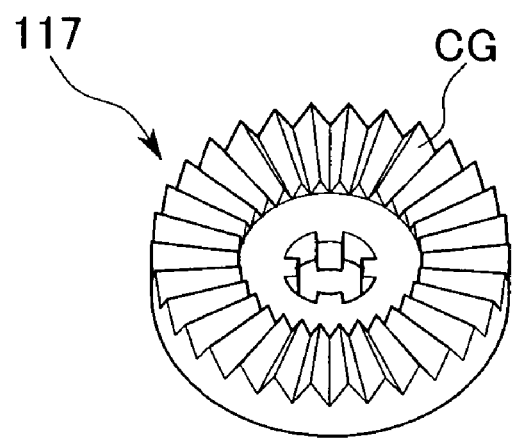
FIG. 23 is a perspective view showing a clutch gear of the mounting portion for the rotatable tray.

As shown in FIGS. 23 and 25, in an upper circular surface of the clutch gear 117, there are formed engagement teeth CG. The engagement teeth CG of the clutch gear 117 are formed so as to slightly incline toward a center axis thereof. An upper gear 118, which includes engagement teeth UG, is disposed on the clutch gear 117 with the engagement teeth UG being engaged with the engagement teeth CG of the clutch gear 117. The clutch gear 117 can be locked with respect to the upper gear 118, i.e., the engagement teeth CG of the clutch gear 117 can engage the engagement teeth UG of the upper gear 118, at every tooth combination.

Figure 24:
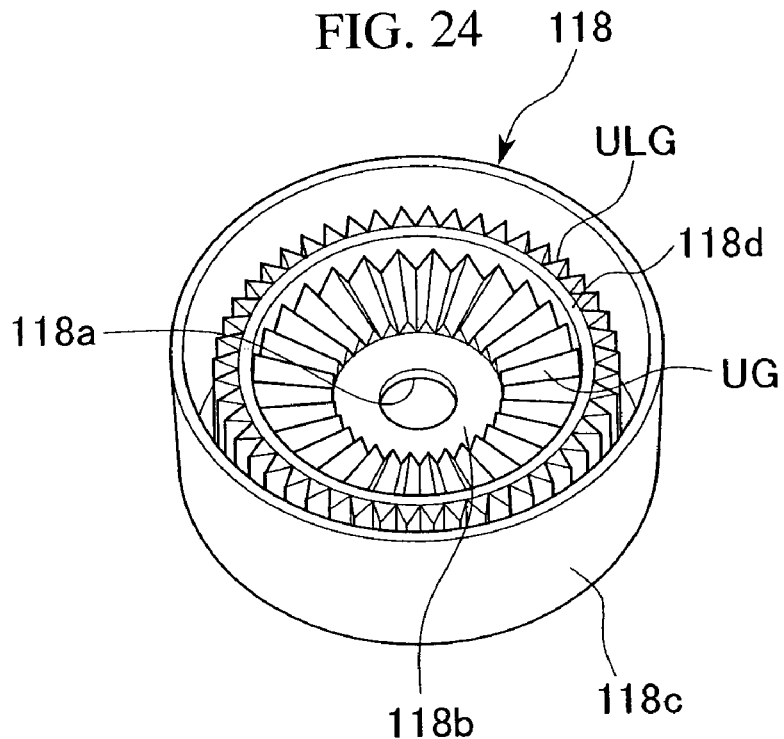
FIG. 24 is an upward perspective view showing an upper gear of the mounting portion for the rotatable tray.

As shown in FIGS. 24 and 25, the upper gear 118 includes a circular disc portion 118b having a hole 118a into which the small diameter portion 111b of the shaft 111 is to be inserted, and a receiving portion 118c which is formed in a circular concave shape so as to surround the circular disc portion 118b. In the underside of the circular disc portion 118b of the upper gear 118, there are formed the engagement teeth UG that are engageable with the engagement teeth CG of the clutch gear 117. Moreover, in an outer surface of an inner wall 118d of the receiving portion 118c, there are formed upper lock teeth ULG extending in the vertical direction (having a length of L), which are engageable with the lower lock teeth LLG of the lower gear 97.

Figure 26:
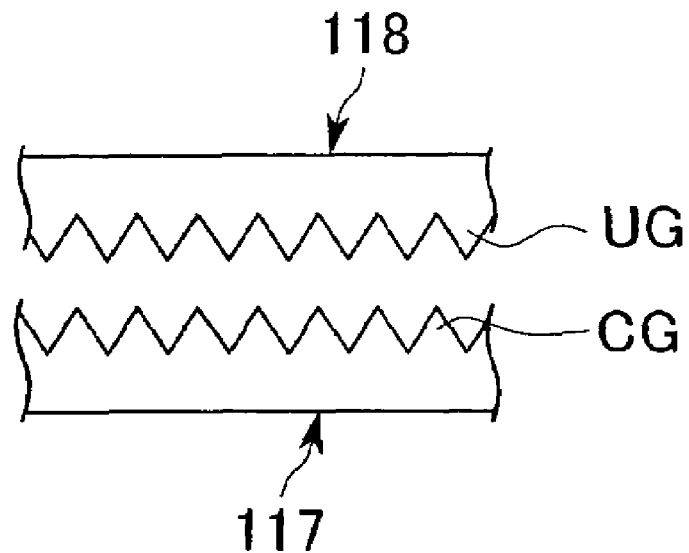
FIG. 26 is a side view showing a state in which the clutch gear is disengaged from the upper gear.
Figure 27:
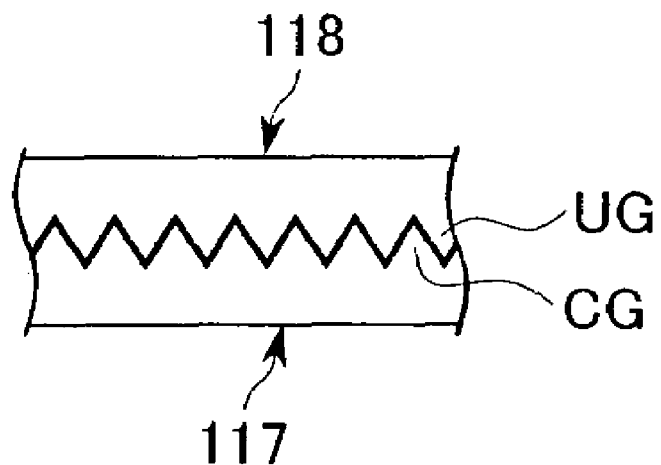
FIG. 27 is a side view showing a state in which the clutch gear engages the upper gear.

A cap 119 is provided so as to be penetrated by the small diameter portion 111b of the shaft 111 in a slidable manner. Coming off of the cap 119 is prevented by a bushing 121 which is fixed at an end of the small diameter portion 111b of the shaft 111 using a screw 120. The cap includes a holding portion 119a for holding a spring 122 that is disposed between the circular disc portion 118b of the upper gear 118 and the cap 119. Accordingly, the upper gear 118 is biased downward by the spring 122. The engagement teeth UG of the upper gear 118 are made engageable (see FIG. 27) with the engagement teeth CG of the clutch gear 117, and disengageable (see FIG. 26) from the engagement teeth CG of the clutch gear 117. FIG. 21 shows an engaged state.

Figure 28:
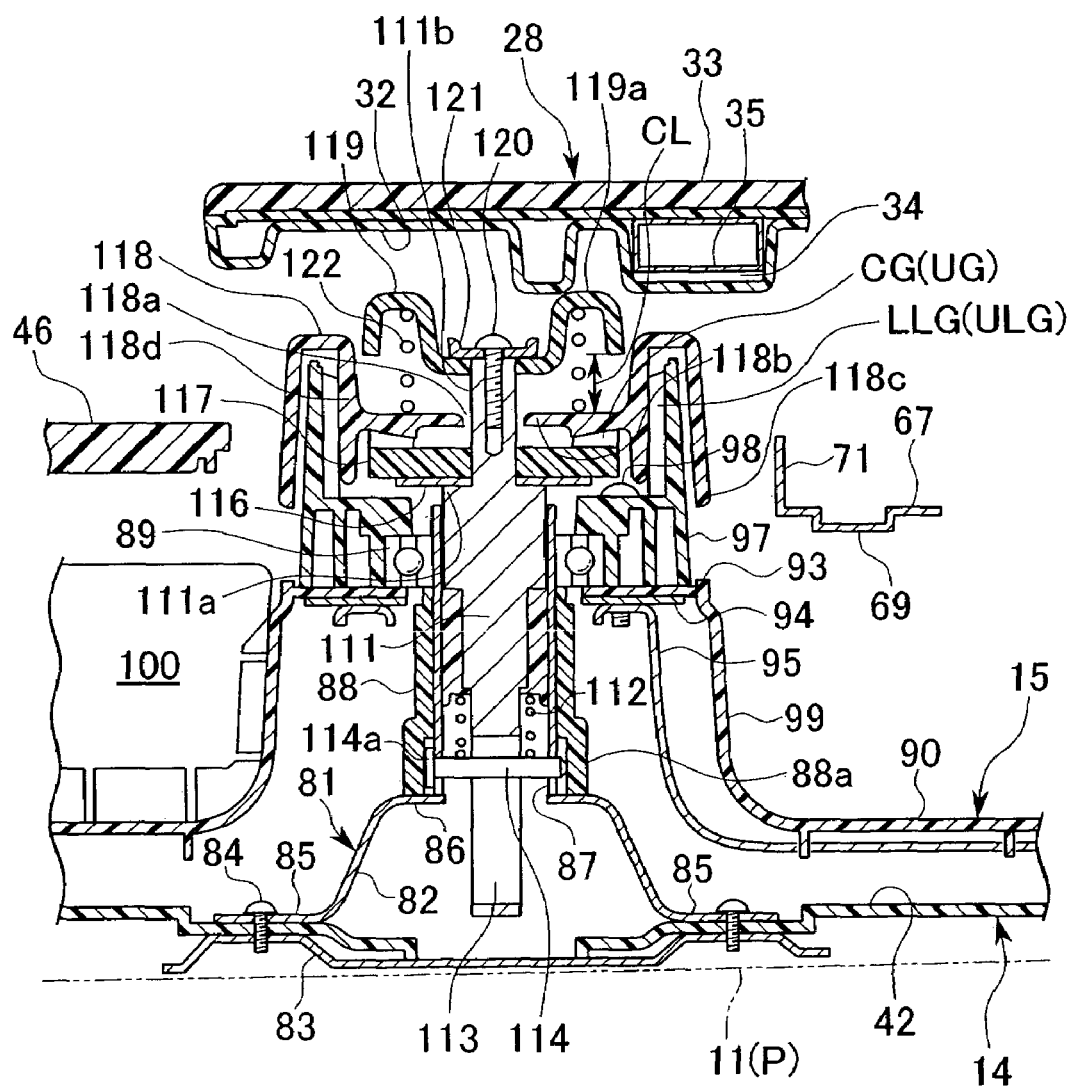
FIG. 28 is a cross-sectional view showing a state in which the floor lid is closed, and the clutch gear engages the upper gear.

More specifically, when the floor lid 28 is closed, and an upper portion of the cap 119 is pressed so that the spring 112 is compressed, as shown in FIG. 28, the upper gear 118 and the cap 119 move downward together with the shaft 111 while maintaining the positional relationship between the upper gear 118 and the cap 119, i.e., while the engagement teeth UG of the upper gear 118 are maintained to engage the engagement teeth CG of the clutch gear 117, and the upper lock teeth ULG of the upper gear 118 engage the lower lock teeth LLG of the lower gear 97.

The spring constant of the spring 112 is determined such that, when the floor lid 28 is closed, the shaft 111 is moved downward without blocking a closing operation of the floor lid 28. On the other hand, the spring constant of the spring 122 is set to be greater than that of the spring 112, and is determined such that an amount of lift CL is ensured for allowing the upper gear 118 to move upward while compressing the spring 112 in a state in which the floor lid 28 is closed.

In other words, the spring 122 is constructed such that, when an excessive rotational force is applied to the tray 15 in a state in which the floor lid 28 is closed, and a rotational force is applied to the upper gear 118 via the lower lock teeth LLG of the lower gear 97 and the upper lock teeth ULG of the upper gear 118, the engagement teeth UG of the upper gear 118 engaging the engagement teeth CG of the clutch gear 117 (see FIG. 27) move over the engagement teeth CG of the clutch gear 117 so that the engagement state is temporarily cancelled (indicated by the dashed line in FIG. 21, and see FIG. 26) for absorbing the rotational force.

Figure 29:
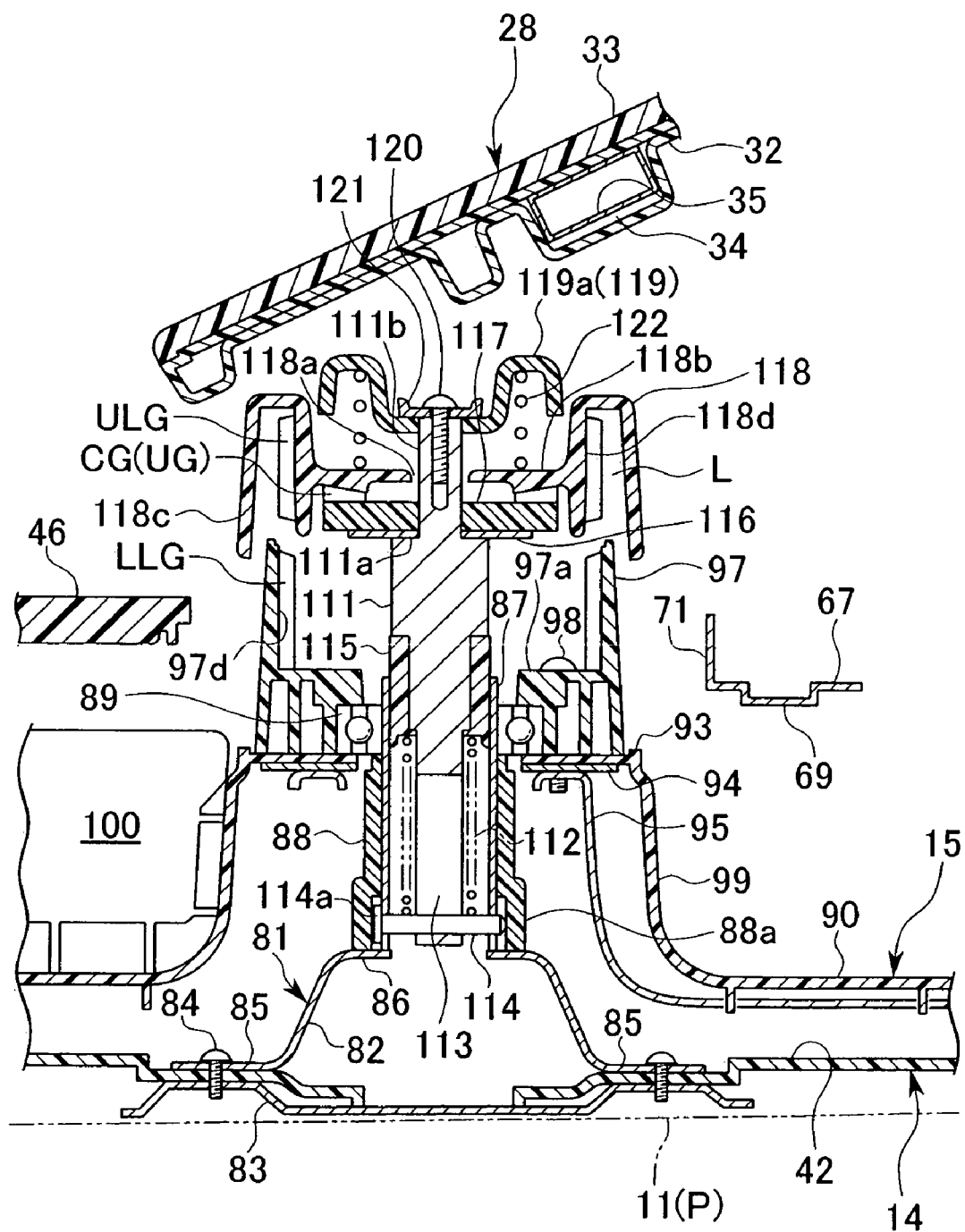
FIG. 29 is a cross-sectional view showing a state in which the floor lid is opened, and the clutch gear is disengaged from the upper gear.

The spring constant of the spring 112 is determined such that, when the floor lid 28, which has been in a closed state, is opened, and the cap 119 is released from being pressed, as shown in FIG. 29, the spring 112 allows the shaft 111 to move upward so that the upper lock teeth ULG of the upper gear 118 are disengaged from the lower lock teeth LLG of the lower gear 97.

Because both the lower lock teeth LLG of the lower gear 97 and the upper lock teeth ULG of the upper gear 118 have a length of L and extend in the vertical direction, the engagement of the upper gear 118 with the lower gear 97 is ensured even when there are some deviations in vertical dimensions; therefore, strict accuracy is not required in positioning the upper gear 118 and the lower gear 97.

In addition, because the upper gear 118 is biased downward by the spring 122, the engagement of the engagement teeth UG of the upper gear 118 with the engagement teeth CG of the clutch gear 117 can be reliably ensured regardless of the relative orientation between the engagement of the engagement teeth UG of the upper gear 118 and the engagement teeth CG of the clutch gear 117. When an excessive rotational force is applied to the tray 15, the upper gear 118 reliably moves upward with respect to the clutch gear 117 so that the engagement state is temporarily cancelled for absorbing the rotational force; therefore, portions of elements to which the rotational force is applied will not break.

As explained above, because the engagement teeth UG of the upper gear 118 engage the engagement teeth CG of the clutch gear 117 in a substantially horizontal plane while the rotation of the tray 15 is still allowed, and the lower lock teeth LLG of the lower gear 97 engage the upper lock teeth ULG of the upper gear 118 in a vertically extending cylindrical region so as to allow for deviations in vertical dimensions, such as variation in mounting position of the floor lid 28, the spring constant of the spring 122 can be simply determined while taking into consideration just the allowable rotational force of the tray 15, and the spring constant and the set length of the spring 112 can be simply determined such that the upper lock teeth ULG of the upper gear 118 are disengaged from the lower lock teeth LLG of the lower gear 97 when the floor lid 28 is opened. Because the function of the spring 112 and the function of the spring 122 differ from each other, each of the springs 112 and 122 can be easily designed.

According to the above embodiment, when the floor lid 28 is closed, as shown in FIG. 28, the floor F becomes flat; therefore, the occupants can walk through the aisle 13 without any obstacles. In this case, because the floor lid 28 has strength and stiffness which are equivalent to that of the floor F due to the closed cross-section portions 34 and the metal frames 35, the occupants walking on the floor lid 28 will not feel unusual sensations.

Because the engagement teeth UG of the upper gear 118 engage the engagement teeth CG of the clutch gear 117 when the floor lid 28 is closed, the tray 15 is locked with respect to the floor bucket 14, i.e., the rotation of the tray 15 is not allowed; therefore, unpleasant noise due to the rotation of the tray 15 will not be emitted.

When an excessive rotational force is applied to the tray 15 due to such as a braking operation of the vehicle, and the rotational force being applied to the tray 15 is transmitted from the lower gear 97 to the upper gear 118, the engagement teeth UG of the upper gear 118 engaging the engagement teeth CG of the clutch gear 117 move over the engagement teeth CG of the clutch gear 117 while compressing the spring 122 upwardly so that the engagement state is temporarily cancelled. As a result, portions of elements to which the rotational force is applied will not break.

On the other hand, when the floor lid 28 is opened, as shown in FIG. 29, the shaft 111, which has been pressed by the floor lid 28, moves upward due to the spring 112 so that the upper lock teeth ULG of the upper gear 118 are disengaged from the lower lock teeth LLG of the lower gear 97, and the locking of the tray 15 in the rotational direction is cancelled; therefore, the tray 15 can smoothly rotate, aided by the bearing 89, in a plane that is substantially parallel to a plane portion of the floor F.

Accordingly, a user can take out an item from a predetermined storage section 101 which is defined by the partitions 100, and can store an item into a predetermined storage section 101, by rotating the tray 15 to a desired rotational position. In addition, items can be stored in the storage sections 101 in an orderly manner.

Because each of the partitions 100 can be attached into one of the grooves 103 in the ribs 102 of the tray 15 in a detachable manner, the tray 15 can be used conveniently in a manner in which, for example, one of the partitions 100 is removed so as to unite two storage sections 101 into one so that a large item can be stored therein.

In the closed state of the floor lid 28, the space 75 between the floor lid 28 and the tray 15 is, in general, a dead space; however, in this embodiment, a notebook-size personal computer, such as the notebook-size personal computer N, can be placed therein by using the PC bracket 67 and the two concave portions 68 formed in the flange portion 48 of the floor bucket 14. Accordingly, a notebook-size personal computer, such as the notebook-size personal computer N, which is widely used but is difficult to hold in a vehicle, can be stably held in the vehicle 1.

Moreover, the position of the PC bracket 67 can be adjusted depending on the dimension, in the longitudinal direction, of the notebook-size personal computer N by inserting the pins 74, which are provided on the end portions of the PC bracket 67, into the locating holes 73 formed in each of the set bases 66 in a selective manner.

In addition, because the rubber seal 76 is attached to the upper surface of the flange portion 48 so as to surround the rear half of the floor bucket 14, the hollow lip 78 of the rubber seal 76 contacts the underside of the floor lid 28, including the underside of the concave-shaped portion 32a, in a sealed manner when the floor lid 28 is closed. Accordingly, even when juice, beverages, water dripped from an umbrella, etc., flows forward from the floor carpet 26 located under the second row seats 3, such fluid will not flow into the floor bucket 14.

Specifically in this embodiment, because the hook 52 shown in FIG. 12 can be easily disengaged from the striker 53 through the steps of removing the lock pin 57 shown in FIG. 13 by pulling pivotable handle 60, removing the clip 65 from the attachment piece 50, and pulling the floor bucket 14, the floor bucket assembly FB can be removed, as indicated by the dashed line in FIG. 5. On the other hand, the floor bucket assembly FB can be easily fixed in the concave portion 11 through the steps of engaging the hooks 52 of the floor bucket 14 with the strikers 53, fixing the attachment piece 50 to the floor panel P using the lock pin 57 and the clip 65. When the floor bucket assembly FB is removed from the concave portion 1, the concave portion 11 formed in the floor F can be used as a large storage space which can accommodate a large item; therefore, the concave portion 11 can be used for multiple purposes in accordance with the desires of the user. As a result, the underfloor storage of the present invention can be used conveniently so that users' satisfaction may be enhanced. In addition, the underfloor storage of the present invention is user-friendly in that the concave portion 11 can be easily cleaned after removing the floor bucket 14, and the floor bucket 14 can be easily cleaned as well after being removed.

When the underfloor storage of the present invention is applied to a vehicle in which changing of seat arrangement is allowed depending on the number of occupants, the concave portion 11, from which the floor bucket assembly FB has been removed, can be used as a storage space for accommodating a center seat 5, which has been detached in a seat arrangement; therefore, usefulness of the underfloor storage is enhanced.

The present invention is not limited to the above embodiment, and additions, omissions, substitutions, and other modifications can be made without departing from the spirit or scope of the present invention. For example, the underfloor storage of the present invention may be applied to a vehicle having two rows of seats or four rows of seats, instead of a vehicle having three rows of seats. In the above embodiment, the size of the concave portion 11 is determined so that the center seat 5, which has been removed and folded, can be accommodated therein; however, the second row seats 3 may be constructed so that each of the second row seats 3 is detachable, and the size of the concave portion 11 may be determined so that each of the second row seats 3, which has been removed and folded, can be accommodated therein. Moreover, in the above embodiment, the floor lid 28 is supported by the closing plate 19 in a pivotable manner; however, the floor lid 28 may be constructed so as to be supported by the floor bucket 14 in a pivotable manner. In the above embodiment, the clip 65 and the hooks 52 are used for fixing the floor bucket 14 in a detachable manner; however, any other elements may be used as long as the floor bucket 14 can be fixed in a detachable manner.

INDUSTRIAL APPLICABILITY

The present invention provides an underfloor storage structure for a vehicle, which allows ease of use, and in which large items can be accommodated. According to the underfloor storage structure of the present invention, small items can be stored in the tray housed in the floor bucket disposed in the concave portion of the floor, and, when the floor bucket is removed from the concave portion formed in the floor, the concave portion can be used as a large storage space which can accommodate a large item. In addition, the concave portion can be cleaned without having the floor bucket therein.

The invention claimed is:

1. An underfloor storage structure for a vehicle, comprising:
   a floor panel having a plane portion and a concave portion, the concave portion extending from a position under a front seat of the vehicle to a position behind the front seat;
   a floor lid for selectively closing and opening a portion of the concave portion located behind the front seat;
   a floor bucket provided in the concave portion in a detachable manner;
   an axle disposed in the floor bucket and under the floor lid; and
   a tray disposed in the floor bucket, said tray being rotatable about the axle and in a plane that is substantially parallel to the plane portion of the floor panel when the tray is disposed in the floor bucket and the floor bucket is provided in the concave portion, the tray being formed in a circular shape in plan view, and having storage sections delimited by radially arranged ribs and partitions engageable with the ribs in a detachable manner,
   wherein the floor lid, the axle, and the tray are configured to allow an item accommodated in one of the storage sections under the front seat to be taken out by opening the floor lid and by rotating the tray, and to not allow rotation of the tray with respect to the floor bucket when the floor lid closes the concave portion while being disposed over the axle.

2. An underfloor storage structure for a vehicle according to claim 1, wherein two pairs of engagement portions are provided on the floor bucket and the concave portion, one of which is disposed at a forward position with respect to the axle and underside of a bottom wall of the floor bucket, and acts to position the floor bucket with respect to the concave portion, the other of which is disposed at a backward position with respect to the axle and at a flange portion of the floor bucket, and acts to fix the floor bucket in the concave portion.

3. An underfloor storage structure for a vehicle according to claim 1, further comprising:
   a lower gear fixed to the floor bucket;
   an upper gear connectable to the tray and engageable with the lower gear; and
   a spring biasing the upper gear toward the lower gear, wherein
   when the floor lid closes the concave portion, the upper gear is connected to the tray and rotation of the tray with respect to the floor bucket is not allowed due to engagement of the upper gear with the lower gear, and
   the spring is configured to allow the upper gear to move away from the lower gear so that the engagement of the upper gear with the lower gear temporarily cancelled when an excessive rotational force is applied to the tray.

* * * * *